(12) United States Patent
Kapinos et al.

(10) Patent No.: US 11,636,232 B2
(45) Date of Patent: Apr. 25, 2023

(54) APPARATUS, METHOD, AND PROGRAM PRODUCT FOR SELECTIVELY OBSCURING DATA BEING DISPLAYED

(71) Applicant: LENOVO (Singapore) PTE. LTD., New Tech Park (SG)

(72) Inventors: Robert J. Kapinos, Durham, NC (US); Russell Speight VanBlon, Raleigh, NC (US); Scott W. Li, Cary, NC (US); Robert J. Norton, Raleigh, NC (US)

(73) Assignee: Lenovo (Singapore) Ltd. Pte., New Tech Park (SG)

( * ) Notice: Subject to any disclaimer, the term of this patent is extended or adjusted under 35 U.S.C. 154(b) by 408 days.

(21) Appl. No.: 16/867,229

(22) Filed: May 5, 2020

(65) Prior Publication Data

US 2021/0350033 A1 Nov. 11, 2021

(51) Int. Cl.
*G06F 21/84* (2013.01)
*G06F 21/62* (2013.01)
*H04M 1/72454* (2021.01)
*H04M 1/72457* (2021.01)
*H04M 1/72463* (2021.01)

(52) U.S. Cl.
CPC .......... *G06F 21/84* (2013.01); *G06F 21/6209* (2013.01); *H04M 1/72454* (2021.01); *H04M 1/72457* (2021.01); *H04M 1/72463* (2021.01)

(58) Field of Classification Search
CPC ................. G06F 21/84; G06F 21/6209; G06F 2221/2111; G06F 21/6245; H04M 1/72454; H04M 1/72457; H04M 1/72463; H04M 1/72403
USPC ..................... 726/26; 455/410, 414.1–414.2, 455/456.1–457, 566
See application file for complete search history.

(56) References Cited

U.S. PATENT DOCUMENTS

2007/0067852 A1* 3/2007 James ..................... G06F 21/84
726/28
2009/0323087 A1* 12/2009 Luo ........................ G06F 21/608
358/1.9
2010/0313239 A1* 12/2010 Chakra ............... G06F 21/6218
715/741

* cited by examiner

*Primary Examiner* — Michael Y Mapa
(74) *Attorney, Agent, or Firm* — Kunzler Bean & Adamson

(57) ABSTRACT

Apparatus, methods, and program products for selectively obscuring data being displayed is disclosed. One apparatus includes a processor and a memory that stores code executable by the processor. The code is executable by the processor to determine a security classification for data being displayed on a display and selectively obscure the data being displayed on the display based on the determined security classification for the data. Methods and computer program products that perform the operations and/or functions of the apparatus are also disclosed.

20 Claims, 34 Drawing Sheets

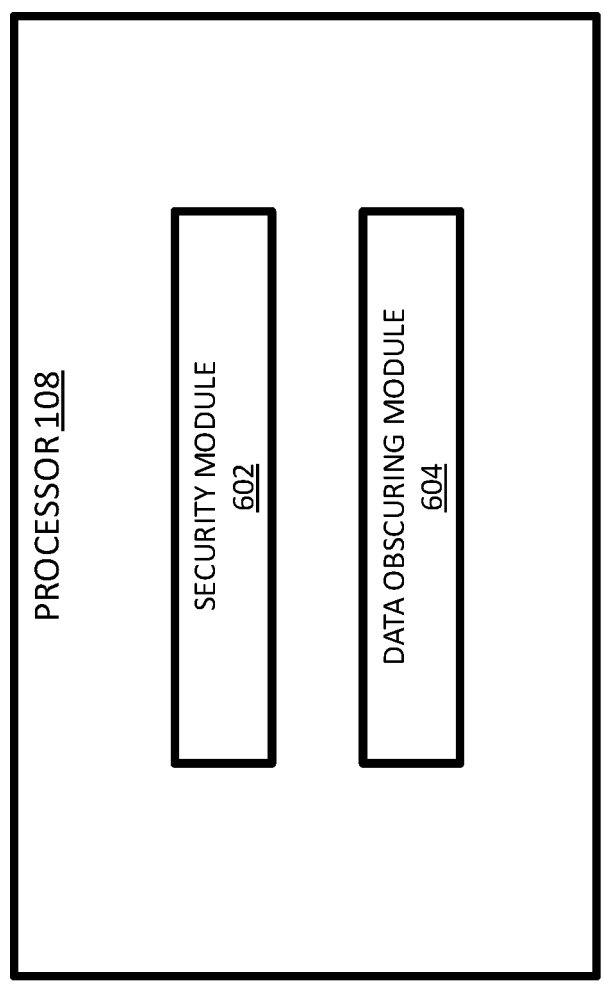

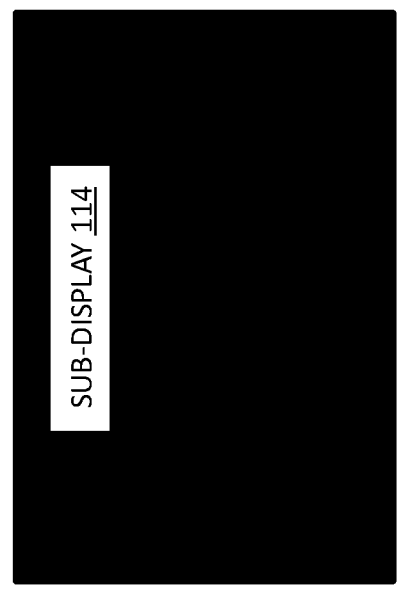
FIG. 9A
FIG. 9B
FIG. 9C

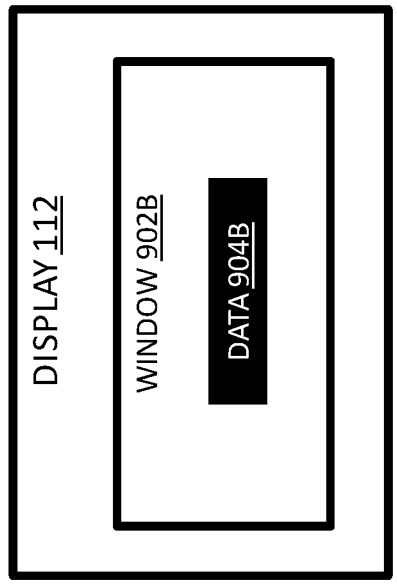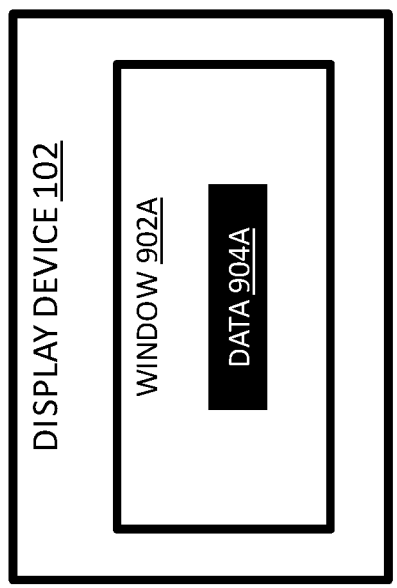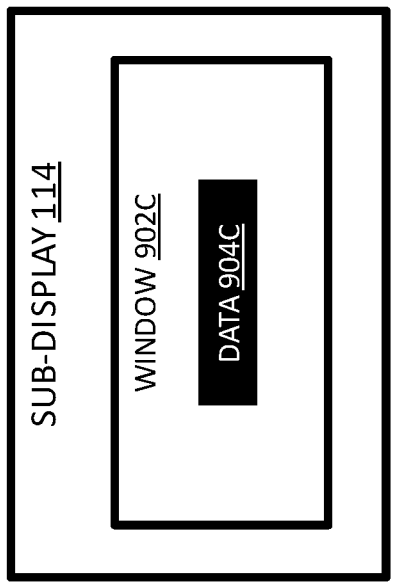

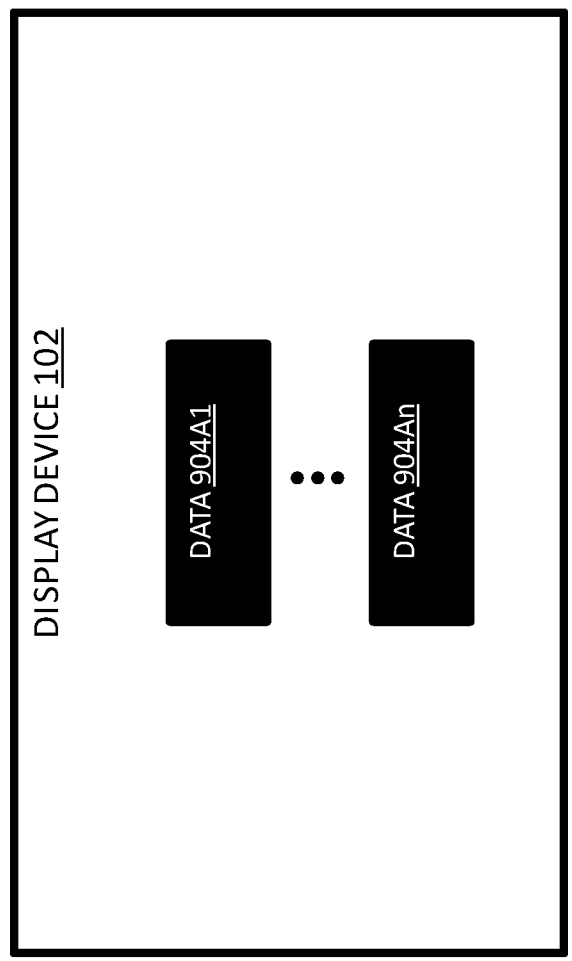

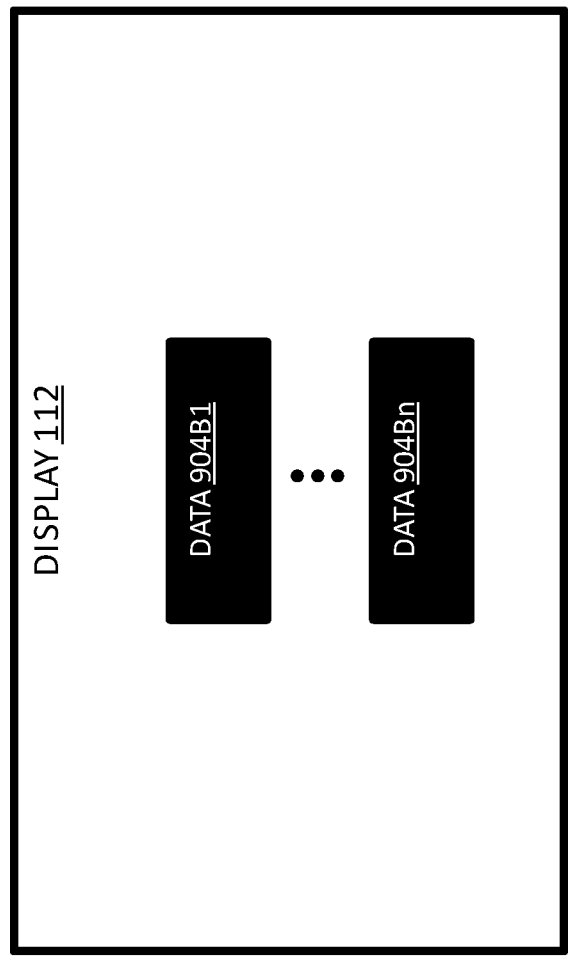

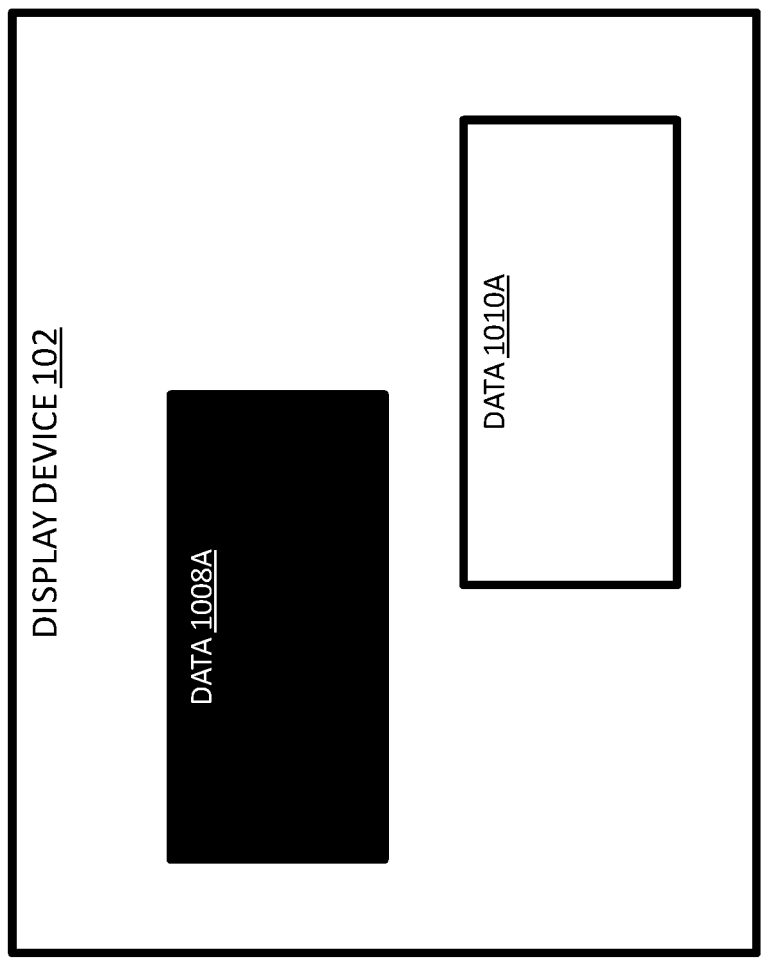

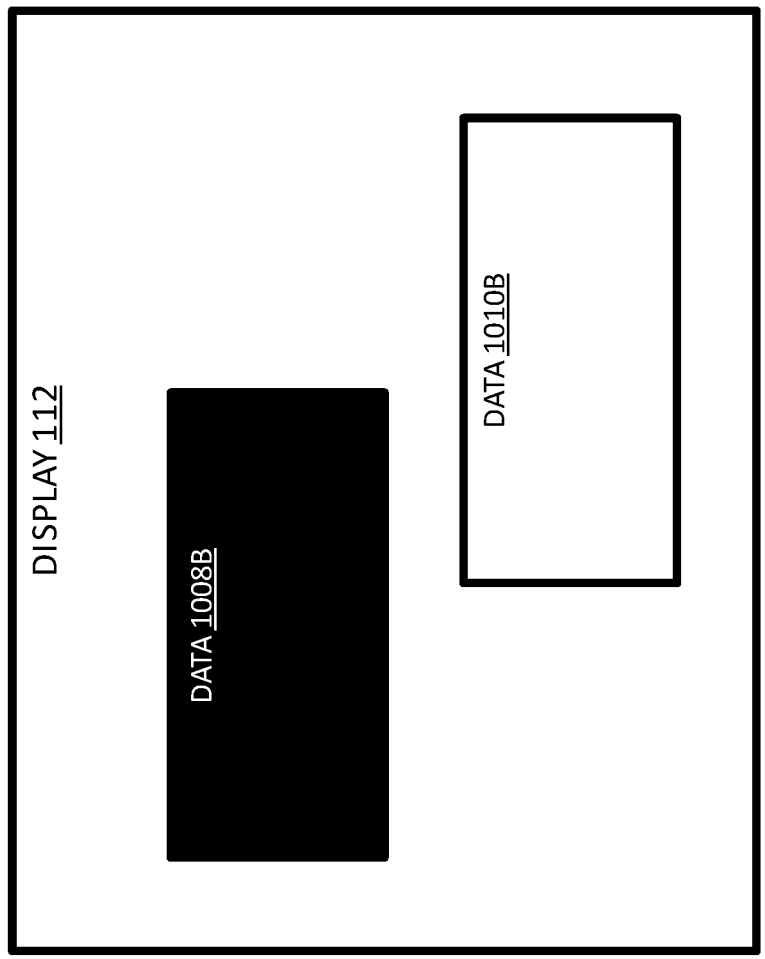

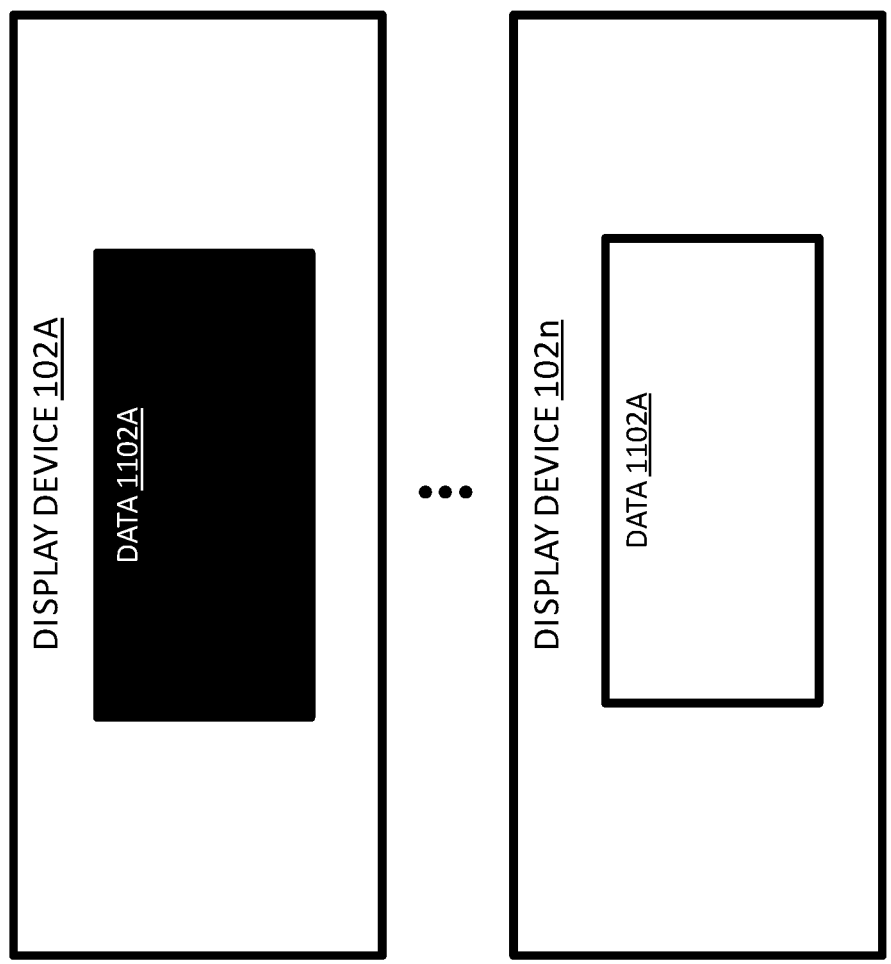

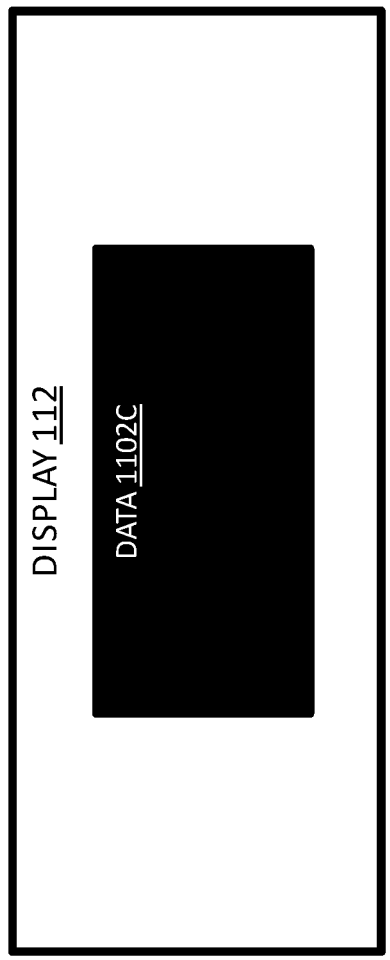
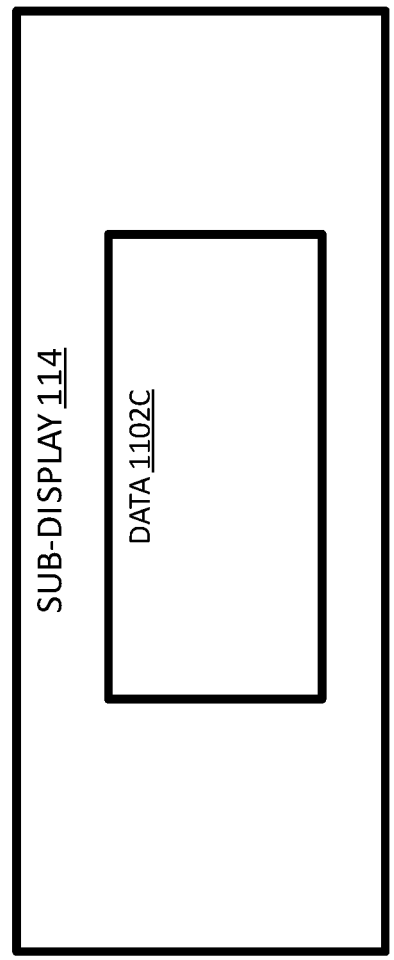
FIG. 11C

APPARATUS, METHOD, AND PROGRAM PRODUCT FOR SELECTIVELY OBSCURING DATA BEING DISPLAYED

FIELD

The subject matter disclosed herein relates to computing displays and more particularly relates to selectively obscuring data being displayed.

DESCRIPTION OF THE RELATED ART

Information handling devices, such as desktop computers, laptop computers, tablet computers, smart phones, optical head-mounted display units, smart watches, smart devices, voice-controlled electronic devices, televisions, streaming devices, etc., are ubiquitous in society. These information handling devices generally include and/or are connected to a set of displays and/or sub-displays. Keeping data secure and private when the data is being displayed on a display and/or sub-display may be desirable in at least some situations, at certain times, and/or in particular environments.

BRIEF SUMMARY

An apparatus for selectively obscuring data being displayed is disclosed. A method and computer program product also perform the functions of the apparatus. In one embodiment, the apparatus includes a processor and a memory that stores code executable by the processor. The code, in various embodiments, is executable by the processor to determine a security classification for data being displayed on a display and selectively obscure the data being displayed on the display based on the determined security classification for the data.

A method, in one embodiment, includes determining, by a processor, a security classification for data being displayed on a display. In certain embodiments, the method further includes selectively obscuring the data being displayed on the display based on the determined security classification for the data.

In one embodiment, a program product includes a computer-readable storage medium that stores code executable by a processor. The executable code, in certain embodiments, includes code to perform determining a security classification for data being displayed on a display and selectively obscuring the data being displayed on the display based on the determined security classification for the data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a schematic block diagram of one embodiment of a processor included in the computing systems of FIGS. 1 and 2 and the information handling devices of FIGS. 3 through 5;

FIGS. 11A through 11F are schematic block diagrams illustrating various examples of data and/or data content being obscured on a displaying device in the computing systems of FIG. 2 and the information handling devices of FIGS. 4 and 5;

DETAILED DESCRIPTION

Figure 1:
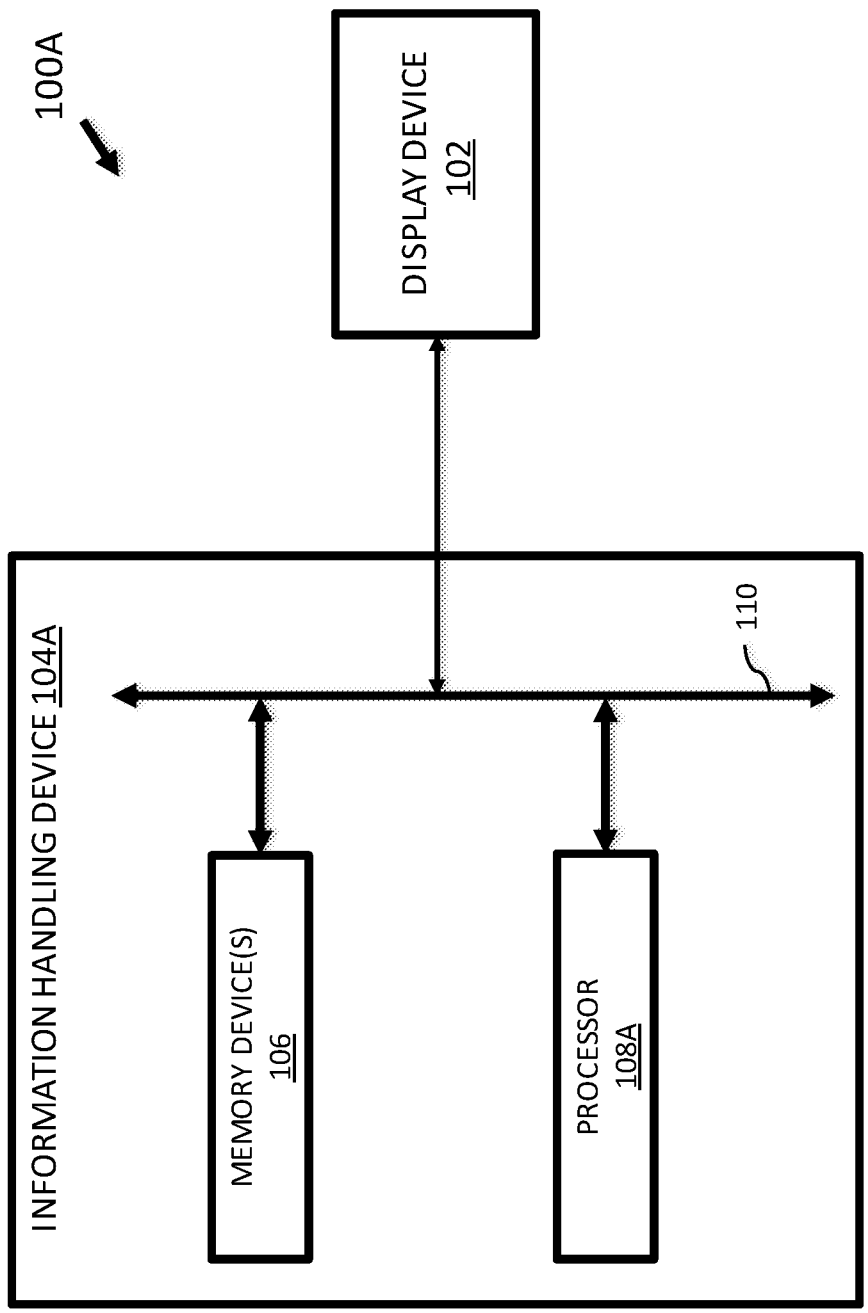
FIG. 1 is a schematic block diagram of one embodiment of a computing system (and/or computing network) that can selectively obscure data and/or data content.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms a, an, and the also refer to one or more unless expressly specified otherwise.

In addition, as used herein, the term set can mean one or more, unless expressly specified otherwise. The term sets can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram of one embodiment of a computing system 100A (and/or computing network) that can selectively obscure data and/or data content. At least in the illustrated embodiment, the computing system 100A includes, among other components, a display device 102 coupled to and/or in communication with an information handling device 104A (e.g., a desktop computer). In various embodiments, the information handling device 104A includes, among other components, a set of memory devices 106 coupled to and/or in communication with a processor 108A via a bus 110 (e.g., a wired and/or wireless bus).

Figure 2:
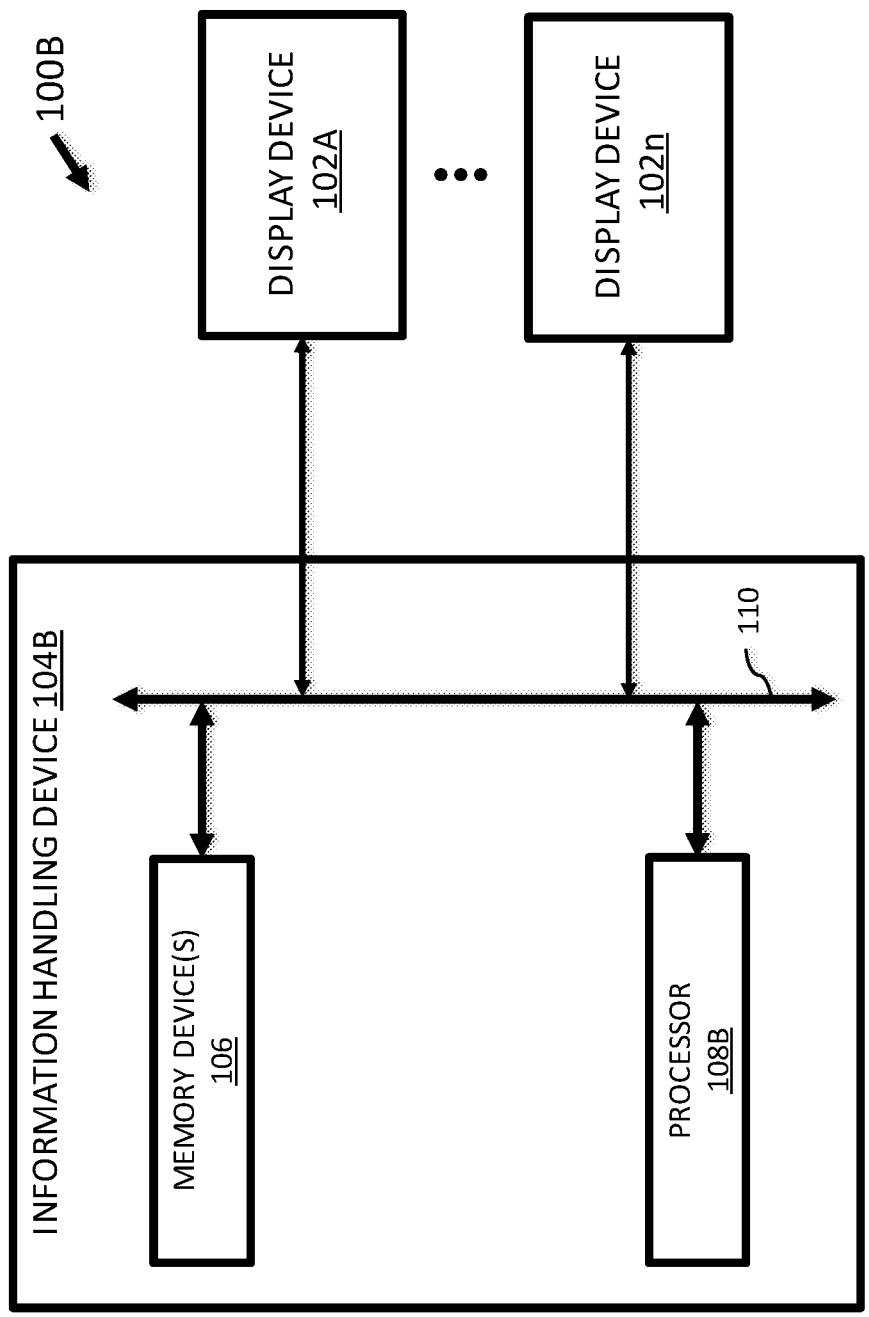
FIG. 2 is a schematic block diagram of another embodiment of a computing system (and/or computing network) that can selectively obscure data and/or data content.

FIG. 2 is a schematic diagram of another embodiment of a computing system 100B (and/or computing network) that can selectively obscure data and/or data content. At least in the illustrated embodiment, the computing system 100B includes, among other components, two or more display devices 102A through 102n coupled to and/or in communication with an information handling device 104B (e.g., a desktop computer). In various embodiments, the information handling device 104B includes, among other components, a set of memory devices 106 coupled to and/or in communication with a processor 108B via a bus 110.

Figure 3:
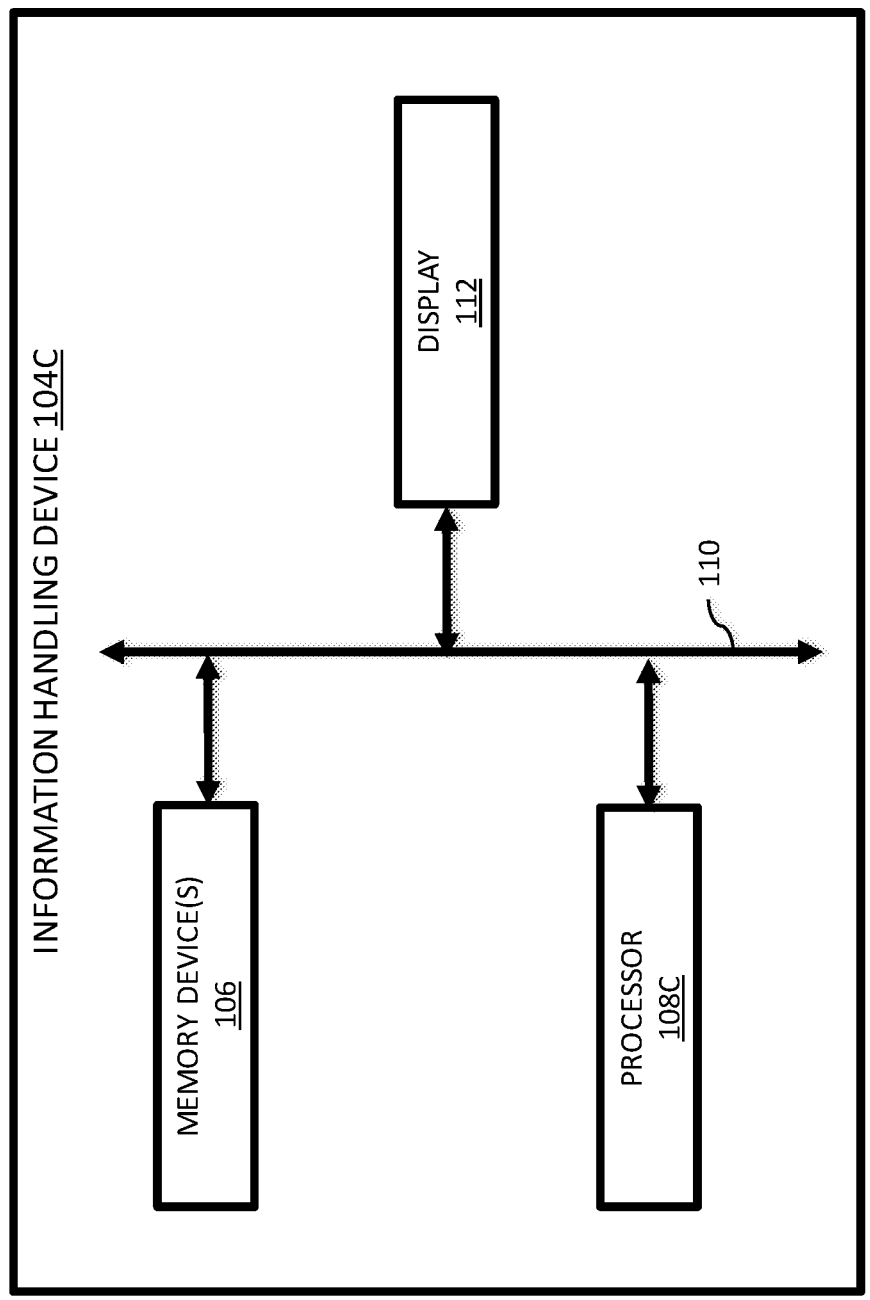
FIG. 3 is a schematic block diagram of one embodiment of an information handling device that can selectively obscure data and/or data content.

FIG. 3 is a schematic block diagram of one embodiment of an information handling device 104C (e.g., a laptop computer, a smartphone, a smartwatch, a PDA, a wearable, etc.) that can selectively obscure data and/or data content. At least in the illustrated embodiment, the information handling device 104C includes, among other components, a set of memory devices 106, a processor 108C, and a display 112 coupled to and/or in communication with one another via a bus 110.

Figure 4:
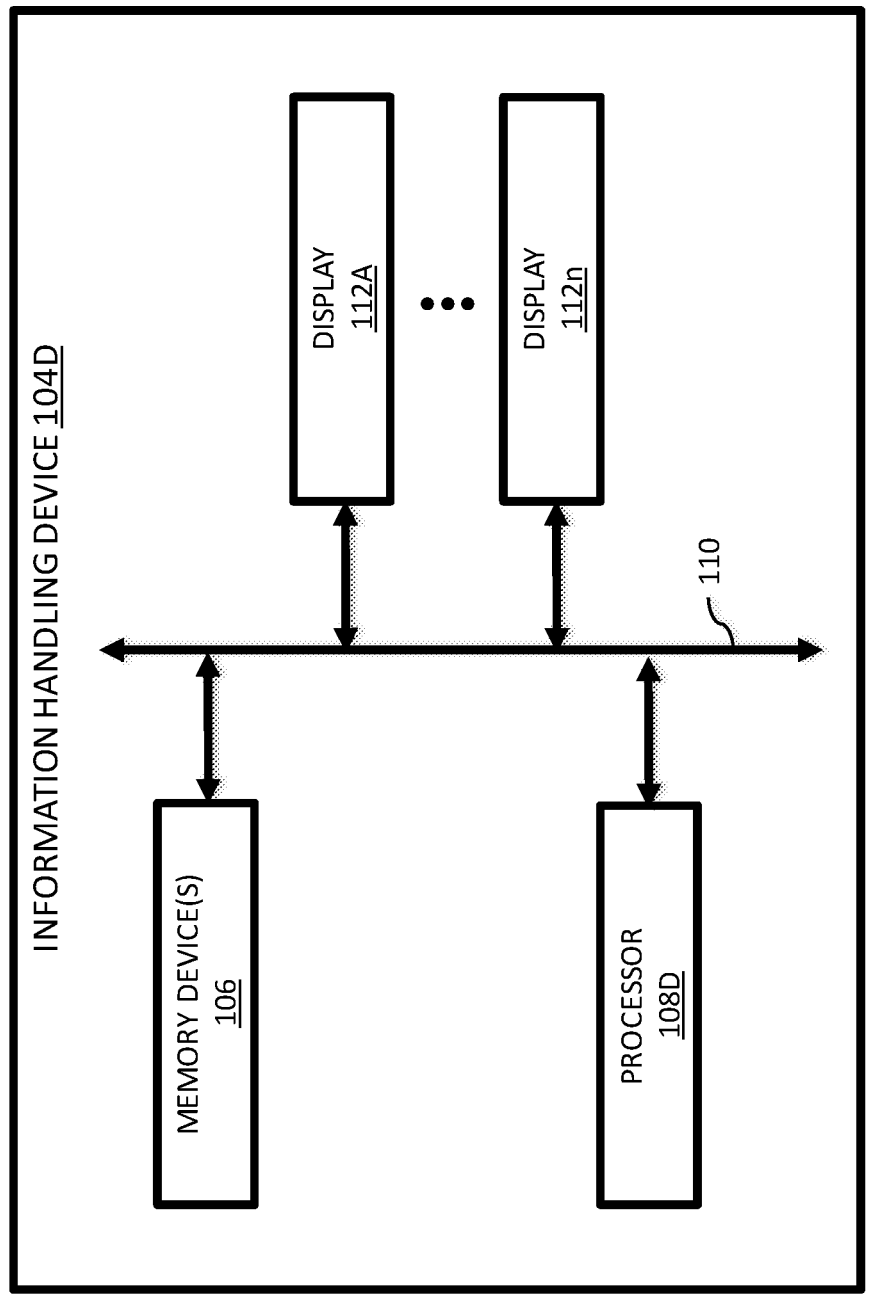
FIG. 4 is a schematic block diagram of another embodiment of an information handling device that can selectively obscure data and/or data content.

FIG. 4 is a schematic block diagram of another embodiment of an information handling device 104D (e.g., a laptop computer, a smartphone, a smartwatch, a PDA, a wearable, etc.) that can selectively obscure data and/or data content. At least in the illustrated embodiment, the information handling device 104D includes, among other components, a set of memory devices 106, a processor 108D, and two or more displays 112A through 112n coupled to and/or in communication with one another via a bus 110.

Figure 5:
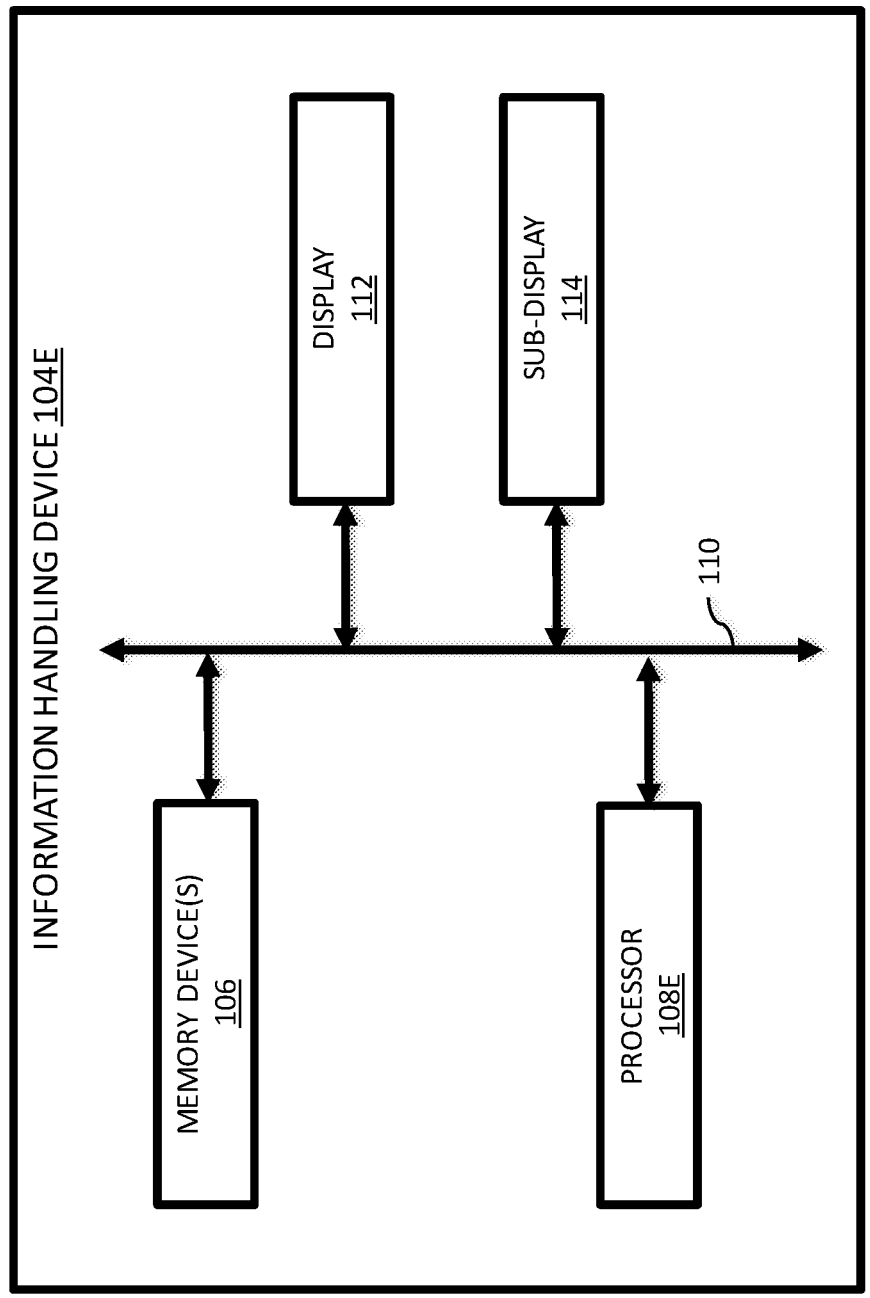
FIG. 5 is a schematic block diagram of yet another embodiment of an information handling device that can selectively obscure data and/or data content.

FIG. 5 is a schematic block diagram of yet another embodiment of an information handling device 104E (e.g., a laptop computer, a smartphone, a smartwatch, a PDA, a wearable, etc.) that can selectively obscure data and/or data content. At least in the illustrated embodiment, the information handling device 104E includes, among other components, a set of memory devices 106, a processor 108D, a display 112, and a sub-display 114 coupled to and/or in communication with one another via a bus 110.

The information handling devices 104A through 104E (also simply referred to herein individually, in various groups, or collectively as information handling device(s) 104) may include any suitable computing device that is known or developed in the future. In various embodiments, the information handling device 104 can include a desktop computer, a laptop computer, a personal digital assistant (PDA), a tablet computer, a smart phone, a cellular telephone, a smart television (e.g., televisions connected to the Internet), a wearable, an Internet of Things (IoT) device, a set-top box, a game console, a vehicle on-board computer, a streaming device, a smart device, and a digital assistant, etc., among other information handling devices that are possible and contemplated herein.

With reference to FIGS. 1 and 2, a display device 102, which can simply be referred to herein as, a display 102, may include any suitable hardware and/or software that can display digital information (e.g., digital data) thereon. In various embodiments, the display device 102 includes a monitor or other similar device that can display data thereon. In some embodiments, the display device 102 includes a touch screen that can receive one or more inputs from a user via the user's fingers and/or a stylus, etc.

Referring to FIGS. 3 through 5, a display 112, which can also be referred to herein as a display device 112, may include any suitable hardware and/or software that can display digital information (e.g., digital data) thereon. In various embodiments, the display 112 includes a screen or other similar device that can display data thereon. In some embodiments, the display 112 includes a touch screen that can receive one or more inputs from a user via the user's fingers and/or a stylus, etc.

In FIG. 5, a sub-display 114, which can also be referred to herein as a sub-display device 114, may include any suitable hardware and/or software that can display digital information (e.g., digital data) thereon. In various embodiments, the sub-display 114 includes a screen or other similar device that can display data thereon. In some embodiments, the sub-display 114 includes a touch screen that can receive one or more inputs from a user via the user's fingers and/or a stylus, etc.

In various embodiments, digital data includes, but is not limited to, any suitable computer-readable, computer-writable, and/or computer-usable data that can be displayed on the display device 102, display 112, and/or sub-display 114. Further, the computer-readable, computer-writable, and/or computer-usable data can include digital data that can be displayed on the display device 102, display 112, and/or sub-display 114 via a user interface (UI). The term digital data may also simply be referred to herein as, data.

The UI can include any suitable user interface that is known or developed in the future. Examples of a UI include, but are not limited to, a set of graphical user interfaces (GUI(s)), a set of command line interfaces (CLI(s)), a set of screen readers, and/or other similar UIs. Non-limiting examples of a UI include a set of windows, a set of applications, a set of applets, and/or a set of icons, etc., among other UIs that are possible and contemplated herein. As such, digital data can include any suitable data that can be included within and/or displayed via the GUI(s), CLI(s), screen reader(s), window(s), application(s), applet(s), and/or icon(s), etc., which can further include the entire contents displayed on the display device 102, display 112, and/or sub-display 114, among other embodiments that are possible and contemplated herein.

In various embodiments, the display device 102, display 112, and/or sub-display 114 includes functionality to receive commands for displaying data thereon from an associated information handling device 104. In response to receiving the commands, the display device 102, display 112, and/or sub-display 114 is configured to display data thereon in accordance with the received commands.

While the following discussion is made with reference to various embodiments of the display device 102, such discussion is not limited to a display device 102. That is, while referencing a display device 102 for ease in understanding the various embodiments described herein, the following discussion is equally applicable to various embodiments of the display devices 102A through 102n, the display 112, the displays 112A through 112n, and the sub-display 114.

The display device 102, in various embodiments, is configured to receive a set of obscure commands from the information handling device 104 that commands/instructs the display device 102 to obscure the display of all of the data being displayed and/or the data that is scheduled for display or is about to be displayed on the entirety of the display device 102, a UI on the display device 102, and/or a particular portion of the data. Further, the display device 102 is configured to obscure the display of the data being displayed on the display device 102, the data that is scheduled for display on the display device 102, and/or is about to be displayed on the display device 102, the UI, and/or the particular portion of the data in response to receiving the obscure command(s) from the information handling device 104.

The display device 102, in additional embodiments, is further configured to receive a set of obscure commands and/or a set of display commands from the information handling device 104. In various embodiments, the display device 102, in some embodiments, is configured to receive a set of obscure commands from the information handling device 104 that commands/instructs the display device 102 to obscure the display of at least a portion of the data (e.g., some or all of the data) being displayed and/or the data that is scheduled for display or is about to be displayed on the display device 102 and/or a set of UIs on the display device 102. Here, the display device 102 is configured to obscure the display of the portion(s) of the data being displayed and/or the portion(s) of the data that is scheduled for display or is about to be displayed on the display device 102 and/or the UI(s) in response to receiving the obscure command(s) from the information handling device 104.

In various embodiments, the display commands/instructs the display device 102 to freely display one or more portions of the data being displayed, that is scheduled for display, or is about to be displayed on the display device 102 and/or the UI(s). Further, the display device 102 is configured to freely display the portion(s) of the data being displayed, that is scheduled for display, or is about to be displayed on the display device 102 and/or the UI(s) in response to receiving the display command(s) from the information handling device 104. As used herein, freely displaying can mean that a human is capable of reading and/or viewing data and/or data content.

In view of the various discussions above, some embodiments of the display device 102 enable and/or allow the display device 102 to obscure all of the data being displayed, all of the data that is scheduled for display, or all of the data that is about to be displayed on the display device 102 and/or UI(s). Further, other embodiments of the display device 102 enable and/or allow the display device 102 to selectively obscure the display of one or more portions the data being displayed, portion(s) of the data that is scheduled for display, or portion(s) of the data that is about to be displayed on the display device 102 and/or UI(s) and to freely (and/or selectively) display one or more portions the data being displayed, portion(s) of the data that is scheduled for display, or portion(s) of the data that is about to be displayed on the display device 102 and/or UI(s).

The data and/or the portion(s) of the data may be obscured utilizing any algorithm, method, and/or technique that is known or developed in the future that can conceal data, keep data from being seen by a human, and/or prevent data from being visible by a human. In various embodiments, obscuring data and/or portions of the data include obscuring the data itself or portions of the data, obscuring a window or portion(s) of the window, and/or obscuring a screen or portion(s) of the screen. Examples of obscuring data and/or portions of the data include, but are not limited to, blacking out, graying out, blurring out, fuzzing out, modifying a size (e.g., making smaller, shrinking, making extremely large, etc.), jumbling, scrambling, narrowing a viewing angle, data masking, data obfuscation, and/or encryption, etc., among other examples that can conceal data, keep data from being seen by a human, and/or prevent data from being visible by a human that are possible and contemplated herein.

A set of memory devices 106 may include any suitable quantity of memory devices 106. Further, a memory device 106 may include any suitable type of device and/or system that is known or developed in the future that can store computer-useable and/or computer-readable code. In various embodiments, a memory device 106 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

A memory device 106, in some embodiments, includes volatile computer storage media. For example, a memory device 106 may include random access memory (RAM), including dynamic RAM (DRAM), synchronous dynamic RAM (SDRAM), and/or static RAM (SRAM). In other embodiments, a memory device 106 includes non-volatile computer storage media. For example, a memory device 106 may include a hard disk drive, a flash memory, and/or any other suitable non-volatile computer storage device that is known or developed in the future. In various embodiments, a memory device 106 includes both volatile and non-volatile computer storage media. In additional embodiments, a memory device 106 also stores program code and/or related data, such as an operating system (OS) and/or other controller algorithms operating on an information handling device 104.

Figure 6:
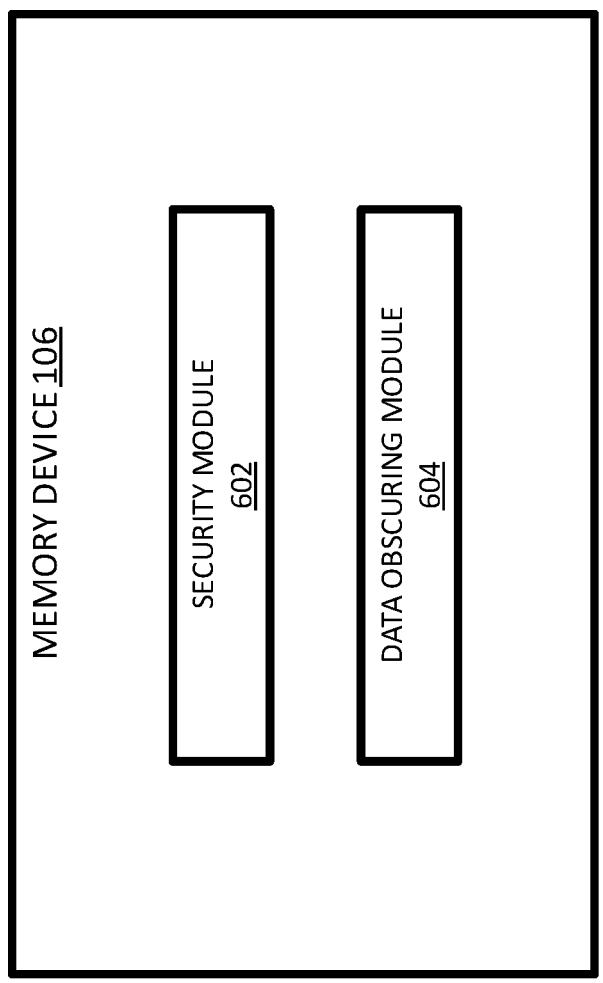
FIG. 6 is a schematic block diagram of one embodiment of a memory device included in the computing systems of FIGS. 1 and 2 and the information handling devices of FIGS. 3 through 5.

Referring to FIG. 6, one embodiment of a memory device 106 is shown. At least in the illustrated embodiment, the memory device 106 includes and/or is configured to store, among other components, data, and/or code, a security module 602 and a data obscuring module 604. In various embodiments, the security module 602 and the data obscuring module 604 include computer-readable and/or computer-useable code that causes a processor (e.g., processors 108A through 108E) to perform a set of functions and/or operations for selectively obscuring the display of data, one or more portions of the data, data content, and/or one or more portions of the data content on a display device 102 (and/or the display devices 102A through 102n, the display 112, the displays 112A through 112n, and the sub-display 114), as discussed in greater detail elsewhere herein.

With reference to FIG. 7, FIG. 7 is a schematic diagram of one embodiment of the processors 108A through 108E. The processors 108A through 108E (also simply referred to herein individually, in various groups, or collectively as processor(s) 108) may include any suitable non-volatile/persistent hardware and/or software configured to perform and/or facilitate performing functions and/or operations for selectively obscuring data and/or data content. In some embodiments, a processor 108 includes hardware and/or software for executing instructions in one or more modules and/or applications that can perform and/or facilitate performing functions and/or operations for selectively obscuring data and/or data content and a data-by-data basis and/or a content-by-content basis.

At least in the illustrated embodiment, the processor 108 includes, among other components, data, and/or code, a security module 602 and a data obscuring module 604. In general, the various embodiments of the security module 602 and the data obscuring module 604 are configured to have their respective functionalities and/or operations coordinated to determine/identify important and/or private data and/or data content on a data-by-data basis and/or a content-by-content basis (e.g., via the security module 602) and obscure the display of the data and/or the data content on a display device 102 to prevent a human from viewing the data and/or data content on the display device 102 (e.g., via the data obscuring module 604). In various embodiments, the security module 602 and the data obscuring module 604 include computer-readable and/or computer-useable code that causes the processor 108 to perform a set of functions and/or operations for selectively obscuring the display of data, one or more portions of the data, data content, and/or one or more portions of the data content on a display device 102 (and/or the display devices 102A through 102n, the display 112, the displays 112A through 112n, and the sub-display 114).

In some embodiments, the security module 602 and the data obscuring module 604 are included in the processor 108. In other embodiments, the security module 602 and the data obscuring module 604 are included in one or more memory devices 106 in the set of memory devices 106. In further embodiments, the processor 108 includes one version (e.g., the original version or a copy) of the security module 602 and the data obscuring module 604 and the set of memory devices 106 (e.g., one or more memory devices 106) includes another version (e.g., the original version or a copy) of the security module 602 and the data obscuring module 604.

Figure 8A:
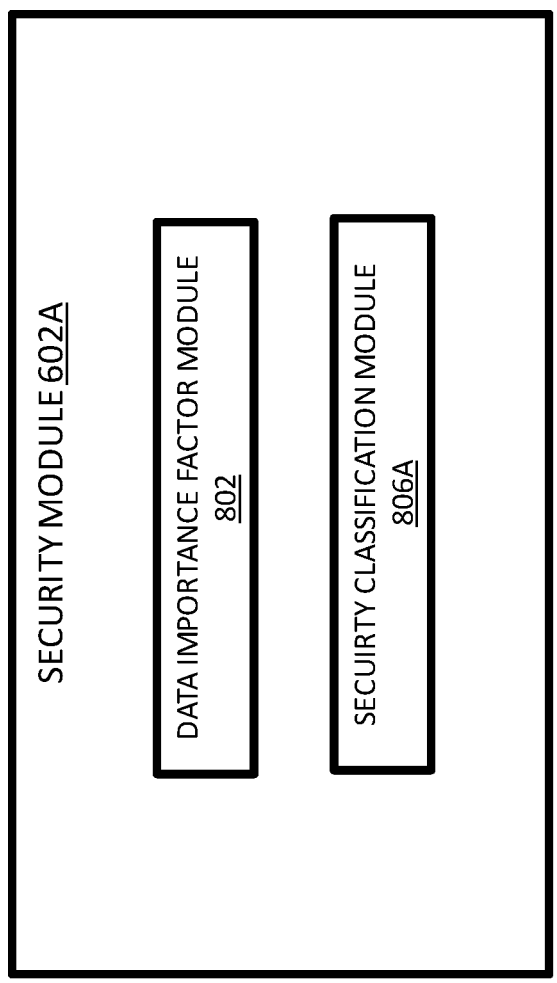
FIG. 8A is a schematic block diagram of one embodiment of a security module that can included in the memory device of FIG. 6 and/or the processor of FIG. 7.
Figure 8B:
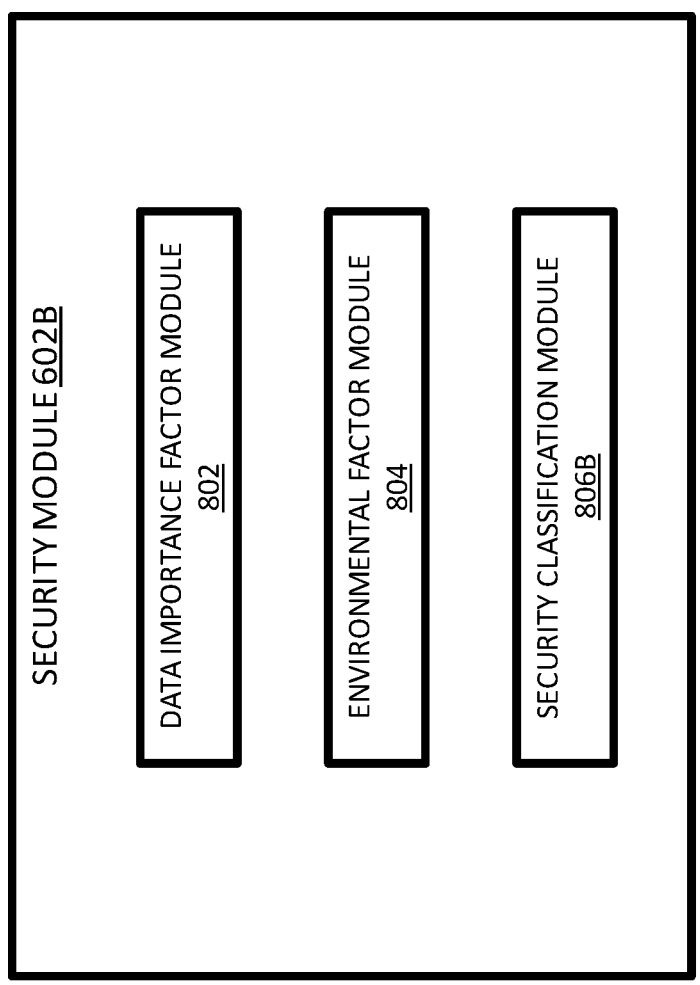
FIG. 8B is a schematic block diagram of another embodiment of a security module that can be included in the memory device of FIG. 6 and/or the processor of FIG. 7.

A security module 602 may include any suitable hardware and/or software that can determine a security classification of a plurality of security classifications for data being displayed on a display device 102, scheduled for display on the display device, and/or that is about to be displayed on the display device 102. Various embodiments of a security module 602A and a security module 602B are shown in FIG. 8A and FIG. 8B, respectively.

A security module 602A may include any suitable hardware and/or software that can determine a security classification of a plurality of security classifications for data, one or more portions of the data, data content, and/or one or more portions of the data content (also simply referred to herein individually, in groups, and/or collectively as, data) being displayed on a display device 102, scheduled for display on the display device 102, and/or about to be displayed on the display device 102. The security module 602A may further include any suitable hardware and/or software that can transmit the determined security classification for the data to the data obscuring module 604. At least in the illustrated embodiment, the security module 602A includes, among other components, a data importance factor module 802 and a security classification module 806A.

A data importance factor module 802 may include any suitable hardware and/or software that can determine and/or identify the importance and/or relative importance of a set of factors (e.g., one or more factors) associated with data and/or the content of data being displayed on a display device 102, scheduled for display on the display device 102, and/or about to be displayed on the display device 102. In various embodiments, the data importance factor module 802 is configured to generate a set of importance metrics (e.g., one or more importance metrics) that indicates and/or represents the importance and/or relative importance of the set of factors associated with the data and/or the data content.

The data importance factor module 802, in various embodiments, is configured to determine and/or identify an importance metric corresponding to one or more factors in the set of factors associated with the data and/or the data content. In various embodiments, the data importance factor module 802 is configured to determine and/or identify the importance metric for each factor or a portion of the factors in the set of factors associated with the data, one or more portions of the data, the content of the data, and/or one or more portions of the content of the data, to generate a set of importance metrics for the data and/or the content of the data.

In some embodiments, the data importance factor module 802 is configured to determine and/or identify the importance metric for each factor or a portion of the factors in the set of factors for the data on a data-by-data basis. In additional or alternative embodiments, the data importance factor module 802 is configured to determine and/or identify the importance metric for each factor or a portion of the factors in the set of factors for the data content on a content-by-content basis. As such, in various embodiments, two or more portions of the data may include different importance metrics assigned to one or more factors their respective set of factors and/or different importance metrics assigned to their respective set of factors, two or more portions of the data content may include different importance metrics assigned to one or more factors their respective set of factors and/or different importance metrics assigned to their respective set of factors, the data and the data content may include different importance metrics assigned to one or more factors their respective set of factors and/or different importance metrics assigned to their respective set of factors, at least one portion of the data includes a different importance metrics assigned to one or more factors in its associated set of factors than the importance metrics assigned to one or more factors in the associated set of factors for at least one portion of the data content, and/or at least one portion of the data includes a different importance metric assigned to its associated set of factors than the importance metric assigned to the associated set of factors for at least one portion of the data content.

The determined/identified importance metric, in certain embodiments, includes a value and/or level that indicates the importance and/or relative importance of its corresponding factor. The value and/or level indicated and/or represented by the importance metric, in some embodiments, is based on the value, importance, and/or privacy/privilege of the data and/or the content of the data (data content) being displayed on a display device 102, scheduled for display on the display device 102, and/or about to be displayed on the display device 102.

The data importance factor module 802 may be configured to determine and/or identify the importance metric for any suitable quantity of factors associated with data, one or more portions of the data, the content of data, and/or one or more portions of the content of data, to generate a set of importance metrics for the data and/or the content of the data. That is, the data importance factor module 802 can be configured to generate a set of importance metrics for any quantity of factors in the data, the one or more portions of the data, the content of the data, and/or the one or more portions of the content of the data that includes any suitable quantity of importance factors.

In various embodiments, a set of importance metrics includes a quantity of importance metrics corresponding to a quantity of factors in the range of about one (1) factor to about ten (10) factors (e.g., the set of importance metrics includes one to ten importance metrics), among other quantities of factors, ranges of quantities of factors, and/or ranges of factors that are possible and contemplated herein. In some embodiments, the set of importance metrics includes one importance metric corresponding to one factor in a set of factors. In additional embodiments, the set of importance metrics includes two importance metrics corresponding to two factors in a set of factors. In various further embodiments, the set of importance metrics includes three importance metrics corresponding to three factors in a set of factors, four importance metrics corresponding to four factors in a set of factors, and five importance metrics corresponding to five factors in a set of factors, among other quantities of importance metrics that are possible and contemplated herein. The embodiments of a set of importance metrics and/or a set of factors discussed above are for illustration purposes and are not intended to limit the quantity and/or scope of importance metrics in a set of importance metrics and/or factors in a set of factors that are possible.

An importance/privacy/privilege value and/or level can be determined and/or identified for any suitable factor associated with data and/or the content of data to define an importance metric for the factor. In various embodiments, factors associated with data or the content of data for which an importance metric may be determined and/or identified by the data importance factor module 802 for a particular data and/or the content of the particular data include, but are not limited to, a source of the data, a source of the data content, the metadata for the data, the metadata for the data content, a type of data of the data (e.g., the data type), a type of content of the data content (e.g., the data content type), a set of tags (e.g., one or more tags) assigned to/included in the data, a set of tags assigned to/included in the data content, a set of designations (e.g., one or more designations) assigned to/included in the data, and/or a set of designations assigned to/included in the data content, etc., among other factors that are and/or can be associated with data and/or the content of data that are possible and contemplated herein. In certain embodiments, the data importance factor module 802 is configured to determine the importance metric of each factor or a subset of factors in a set of factors associated with data and/or the content of data to define a set of importance metrics for particular data and/or the content of the particular data.

A set of importance metrics can be utilized to determine the value or relative value of importance and/or privacy/privilege of data and/or data content and/or to differentiate the importance and/or relative importance of different data, different data types, different data content, and/or different types of data content. Further, the value and/or relative value of importance and/or privacy/privilege associated with each factor in a set of factors for data and/or the content of data defines an importance metric for the set of factors.

For example, the higher the value and/or relative value of importance and/or privilege associated with a particular factor, the higher the corresponding importance metric for that particular factor. Similarly, the lower the value and/or relative value of importance and/or privilege associated with a particular factor, the lower the corresponding importance metric for that particular factor. Furthermore, some factors may have little or no value and/or relative value and can be associated with a zero, null, and/or default importance metric.

Example factors that can include a high and/or relatively high level of value or importance defining a high or relatively high importance metric include, but are not limited to, a valued and/or important source of the data and/or data content (e.g., a client, an employer, an employee, a supplier, a government entity, a relative, a friend, a religious professional and/or entity, a medical professional and/or entity, a financial professional and/or entity, and/or a legal professional and/or entity, etc., among other sources of confidential and/or private data that are possible and contemplated herein), metadata for data that is deemed more valuable and/or important than other data and/or types of data, metadata for data content that is deemed more valuable and/or important than other data content and/or types of data content, a data type (e.g., video data, image data, text data (e.g., alphanumeric characters, symbols, etc.), encrypted data, and/or compressed data, etc., among other data types that are possible and contemplated herein) that is deemed more valuable and/or important than other data types, a type of data content (e.g., a document file (e.g., a letter, a memorandum, notes, a report, etc.), financial content, medical content, legal content, website content (e.g., company website, personal website, etc.), and/or personal content, etc., among other types of data content that are possible and contemplated herein) that is deemed more valuable and/or important than other types of data content, a set of tags (e.g., one or more tags) assigned to and/or associated with a particular data that labels and/or indicates that the data and/or the content of the data is valuable and/or important (e.g., private, confidential, important, proprietary, secret, top secret, privileged, and/or personal, etc., among other tags and/or designations that are possible and contemplated herein), a set of tags assigned to and/or associated with a particular content of data that labels and/or indicates that the data and/or the data content is valuable and/or important, a set of designations (e.g., one or more designations) included in a particular data that labels and/or indicates that the data and/or the content of the data is valuable and/or important (e.g., private, confidential, important, proprietary, secret, top secret, privileged, and/or personal, etc., among other tags and/or designations that are possible and contemplated herein), and/or a set of designations included in a particular content of data that labels and/or indicates that the content of data and/or the data is valuable and/or important, etc., among other factors that can include a high and/or a relatively high level of value and/or importance/privacy that are possible and contemplated herein.

Examples of factors that can include a low and/or relatively low level of value or importance defining a low and/or relatively low importance metric include data and/or data content that does not include the high and/or relatively high importance metric, as discussed above. Other examples of factors that can include a low and/or relatively low importance metric may include data and/or data content that is not deemed valuable, not deemed important, data and/or data content that is publicly or generally known, and/or data and/or data content that is publicly or generally available.

Further, publicly or generally known and/or available data and/or data content may be considered as including little or no value of importance and/or privilege. Here, the data and/or data content may include and/or be associated with a low importance metric, a relatively low importance metric, the lowest importance metric, a non-importance metric (e.g., zero, null, etc.), and/or a default importance metric.

In various embodiments, the data importance factor module 802 is configured to transit the determined/identified set of importance metrics corresponding to the set of factors for the data and/or data content being displayed on the display device 102, the data that is scheduled for display on the display device 102, and/or is about to be displayed on the display device 102 to the security classification module 806A. Further, the security classification module 806A is configured to receive the set of importance metrics generated by the data importance factor module 802 to determine a security classification for the data and/or data content being displayed on the display device 102, the data that is scheduled for display on the display device 102, and/or is about to be displayed on the display device 102.

A security classification module 806A may include any suitable hardware and/or software that can identify and/or determine a security classification of a plurality of security classifications for data and/or data content. A plurality of security classifications may include any suitable quantity of two or more security classifications that can facilitate determining and/or identifying different values of importance and/or privacy between different data, different types of data, different data content, and/or different types of data content and/or that can differentiate levels of importance/privacy/privilege between different data, different types of data, different data content, and/or different types of data content. In various embodiments, a plurality of security classifications includes a quantity of security classifications in the range of about two (2) security classifications to about five (5) security classifications, among other quantities of security classifications, ranges of quantities of security classifications, and/or ranges of security classifications that are possible and contemplated herein.

The plurality of security classifications, in various embodiments, includes a hierarchy of security classifications that indicates the importance and/or relative importance of data and/or data content. In some embodiments, a plurality of security classifications includes two security classifications (e.g., secure/non-secure, yes/no, high/low, zero/one (0/1), positive/negative, etc.). In additional embodiments, a plurality of security classifications includes three (3) security classifications (e.g., low/medium/high, zero/one/two (0/1/2), one/two/three (1/2/3), etc.). In further embodiments, a plurality of security classifications includes four (4) security classifications (e.g., low/medium-low/medium-high/high, zero/one/two/three (0/1/2/3), one/two/three/four (1/2/3/4), etc.). In still further embodiments, a plurality of security classifications includes five (5) security classifications (e.g., low/medium-low/medium/medium-high/high, zero/one/two/three/four (0/1/2/3/4), one/two/three/four/five (1/2/3/4/5), etc.). The various embodiments of a plurality of security classifications discussed above are for illustration purposes and are not intended to limit the quantity and/or scope of the various quantities of security classifications in a plurality of security classifications that are possible, each of which is contemplated and included herein.

A security classification may be defined by any suitable criterion or criteria that can indicate the importance and/or relative importance of data, data content, and/or one or more factors associated with the data and/or data content. In various embodiments, a security classification is defined based on criterion/criteria corresponding to data, data content, and/or a set of factors for the data and/or data content from which a set of importance metrics can be generated.

In some embodiments, a security classification is defined by one or more factors in the set of factors for the data and/or data content including a predefined level and/or relative level of importance metric. In a non-limiting example, a high-level security classification may be defined by at least one factor in a set of factors for data and/or data content including a high-level importance metric, among other levels of importance metric that are possible and contemplated herein. In another non-limiting example, a high-level security classification may be defined by two or more factors in a set of factors for data and/or data content including a high-level importance metric, among other levels of importance metric that are possible and contemplated herein. In yet another non-limiting example, a high-level security classification may be defined by all of the factors in a set of factors for data and/or data content including a high-level importance metric, among other levels of importance metric that are possible and contemplated herein. In still another non-limiting example, a high-level security classification may be defined by at least one factor in a set of factors for data and/or data content including a high-level importance metric and at least one other factor including an importance metric greater than or equal to a predefined importance metric level (e.g., a medium-high level, a medium-level, a medium-low level, etc.), among other levels of importance metric and/or combinations of importance metric levels that are possible and contemplated herein. In a further non-limiting example, a low-level or lowest-level security classification may be defined by at least one factor in a set of factors for data and/or data content including a low-level, default, and/or null importance metric, among other levels of importance metric that are possible and contemplated herein.

In additional or alternative embodiments, a security classification is defined by one or more factors in the set of factors for the data and/or data content including a level and/or relative level of importance metric greater than (or greater than or equal to) a threshold level. In a non-limiting example, a high-level security classification may be defined by at least one factor in a set of factors for data and/or data content including an importance metric greater than a medium-level importance metric, among other levels of importance metric that are possible and contemplated herein. In another non-limiting example, a high-level security classification may be defined by at least one factor in a set of factors for data and/or data content including an importance metric greater than or equal to a medium-low-level importance metric, among other levels of importance metric that are possible and contemplated herein.

The security classification module 806A, in various embodiments, is configured to determine a security classification in the plurality of security classifications for a particular data and/or particular content of the data based on the set of importance metrics for the data and/or data content. In some embodiments, the security classification module 806A is configured to determine the security classification for a particular data and/or particular content of the data by analyzing the set of importance metrics for the data and/or data content and determining whether one or more importance metrics in the set of importance metrics matches the criteria or criterion defining a particular security classification.

The security classification module 806A, in various embodiments, is configured to identify, determine, assign, and/or associate a particular security classification in the plurality of security classifications to data and/or to the content of the data in response to the importance metric(s) in the set of importance metrics identified/determined for the data and/or data content matching the criterion or criteria defining the particular security classification. In additional or alternative embodiments, the security classification module 806A is configured to identify, determine, assign, and/or associate a default, null, and/or non-level security classification to data and/or to the content of the data in response to the importance metric(s) in the set of importance metrics identified/determined for the data and/or data content not matching the criterion or criteria defining any security classification in the plurality of security classifications.

In some embodiments, the security classification module 806A is configured to identify, determine, assign, and/or associate a security classification with the data on a data-by-data basis. In additional or alternative embodiments, the security classification module 806A is configured to identify, determine, assign, and/or associate a security classification with the data content on a content-by-content basis. As such, in various embodiments, two or more portions of the data may include different security classifications, two or more portions of the data content may include different security classifications, the data and the data content may include different security classifications, and/or at least one portion of the data includes a different security classification than at least one portion of the data content.

In some embodiments, the security classification module 806A and/or the security module 602A is/are configured to transmit the security classification for the data and/or the data content that is being displayed on the display device 102, is scheduled for display on the display device 102, and/or is about to be displayed on the display device 102 to the data obscuring module 604. Correspondingly, the data obscuring module 604 is configured to receive the security classification for the data and/or the data content from the security classification module 806A and/or the security module 602A and obscure display or freely display the data, one or more portions of the data, the data content, and/or one or more portions of the data content based on the security classification assigned/associated with the data, the one or more portions of the data, the data content, and/or the one or more portions of the data content.

With reference to FIG. 8B, another embodiment of a security module 602B is shown. A security module 602B may include any suitable hardware and/or software that can determine a security classification of a plurality of security classifications for data, one or more portions of the data, data content, and/or one or more portions of the data content (also simply referred to herein individually, in groups, and/or collectively as, data) being displayed on a display device 102, scheduled for display on the display device 102, and/or about to be displayed on the display device 102. The security module 602B may further include any suitable hardware and/or software that can transmit the determined security classification for the data to the data obscuring module 604.

The security module 602B, in various embodiments, includes a data importance factor module 802 similar to the security module 602A discussed elsewhere herein. At least in the illustrated embodiment, the security module 602B further includes, among other components, an environmental factor module 804 and a security classification module 806B.

An environmental factor module 804 may include any suitable hardware and/or software that can determine and/or identify the importance and/or relative importance of a set of environmental factors (e.g., one or more environmental factors) associated with the environment within which a display device 102 currently resides (also simply referred to herein as, the current environment). In various embodiments, the environmental factor module 804 is configured to generate a set of environmental metrics (e.g., one or more environmental metrics) that indicates and/or represents the importance and/or relative importance of the set of environmental factors associated with the current environment.

The environmental factor module 804, in various embodiments, is configured to determine and/or identify an environmental metric corresponding to one or more environmental factors in the set of environmental factors associated with the current environment. In various embodiments, the environmental factor module 804 is configured to determine and/or identify the environmental metric for each environmental factor in the set of environmental factors associated with the current environment to generate a set of environmental metrics for the current environment.

The determined/identified environmental metric, in certain embodiments, includes a value and/or level that indicates the importance and/or relative importance of its corresponding environmental factor. The value and/or level indicated and/or represented by the environmental metric, in some embodiments, is based on the real-world security level, cyber-security level, and/or privacy level of the current environment, among other values and/or levels that are possible and contemplated herein.

The environmental factor module 804 may be configured to determine and/or identify the environmental metric for any suitable quantity of environmental factors associated with the current environment to generate a set of environmental metrics for the current environment. That is, the environmental factor module 804 can be configured to generate a set of environmental metrics for any quantity of environmental factors in the current environment.

In various embodiments, a set of environmental metrics includes a quantity of environmental metrics corresponding to a quantity of environmental factors in the range of about one environmental factor to about ten environmental factors (e.g., the set of environmental metrics includes one to ten environmental metrics), among other quantities of environmental factors, ranges of quantities of environmental factors, and/or ranges of environmental factors that are possible and contemplated herein. In some embodiments, the set of environmental metrics includes one environmental metric corresponding to one environmental factor in a set of environmental factors. In additional embodiments, the set of environmental metrics includes two environmental metrics corresponding to two environmental factors in a set of environmental factors. In various further embodiments, the set of environmental metrics includes three environmental metrics corresponding to three environmental factors in a set of environmental factors, four environmental metrics corresponding to four environmental factors in a set of environmental factors, and five environmental metrics corresponding to five environmental factors in a set of environmental factors, among other quantities of environmental metrics that are possible and contemplated herein. The embodiments of a set of environmental metrics and/or a set of environmental factors discussed above are for illustration purposes and are not intended to limit the quantity and/or scope of environmental metrics in a set of environmental metrics and/or environmental factors in a set of environmental factors that are possible.

An importance/privacy/privilege value and/or level can be determined and/or identified for any suitable environmental factor associated with the current environment to define an environmental metric for the environmental factor. In various embodiments, environmental factors associated with an environment for which an environmental metric may be determined and/or identified by the environmental factor module 804 for a current environment include, but are not limited to, a geographic location, a display characteristic and/or size of a displaying device (e.g., display device 102, display 112, and sub-display 114), a virtual location, a user-defined location, a virtual boundary, a detected quantity of persons, and/or a detected quantity of electronic devices, etc., among other environmental factors that are and/or can be associated with the current environment that are possible and contemplated herein. In certain embodiments, the environmental factor module 804 is configured to determine the environmental metric of each environmental factor or a subset of environmental factors in a set of environmental factors associated with environments to define a set of environmental metrics for the current environment.

A set of environmental metrics can be utilized to determine the value or relative value of importance and/or privacy/privilege of each environmental factor in the current environment to determine the actual, relative, and/or overall level of privacy and/or security of the current environment. Further, the value and/or relative value of importance and/or privacy/privilege associated with each environmental factor in the current environment defines an environmental metric in the set of environmental factors.

For example, the higher the level of privacy and/or security associated with a particular environmental factor, the lower the corresponding environmental metric for that particular environmental factor. Similarly, the lower the level of privacy and/or security associated with a particular environmental factor, the higher the corresponding environmental metric for that particular environmental factor. Furthermore, some environmental factors may have little or no level of privacy and/or security and can be associated with a highest and/or default environmental metric.

Example environmental factors that can include a high and/or relatively high level of privacy or security defining a low or relatively low environmental metric include, but are not limited to, a particular geographic location (e.g., a company building/office, a home office, etc.), a relative geographic location (e.g., a geographically remote location and/or a location with few detected humans, etc.), a displaying device including a small or relatively small viewing angle and/or size, a secure virtual location (e.g., an area including a network-based security perimeter, a secure network, etc.), a secure area (e.g., an area requiring a security check prior to entering (e.g., via human screening, a badge reader, an Internet of Things (IoT) item, a biometric reader, etc.), a user-defined location, an area that is conducive to geo-fencing, and/or an area that is conducive to user-fencing, etc., among other environmental factors that can include a high and/or relatively high level of privacy or security that are possible and contemplated herein.

Examples of environmental factors that can include a low and/or relatively low level of privacy or security defining a high and/or relatively high environmental metric include but are not limited to, public areas, areas with a quantity of detected persons greater than (or equal to) a predetermined quantity of persons, an unsecure network, an unsecure virtual location, an unsecure area, a displaying device including a normal, average, large, or relatively large viewing angle and/or size, a user-defined location, an area that is not conducive to geo-fencing, and/or an area that is not conducive to user-fencing (e.g., an area susceptible to shoulder surfing, etc.), etc., among other environmental factors that can include a low and/or relatively low level of privacy or security that are possible and contemplated herein.

Further, in some embodiments, a public or unsecure geographic and/or virtual location may be considered as including little or no level of privacy and/or security. Here, the current environment may be associated with and/or assigned a high environmental metric, a relatively high environmental metric, the highest environmental metric, a non-environmental metric (e.g., infinity, etc.), and/or a default environmental metric.

In various embodiments, the environmental factor module 804 is configured to transit the determined/identified set of environmental metrics corresponding to the set of environmental factors for the current environment to the security classification module 806B. In addition, the data importance factor module 802 is configured to transit the determined/identified set of importance metrics corresponding to the set of factors for the data and/or data content to the security classification module 806B. Further, the security classification module 806B is configured to receive the set of environmental metrics generated by the environmental factor module 804 and the set of importance factors generated by the data factor module 802 to determine a security classification for the data and/or data content being displayed on the display device 102, the data that is scheduled for display on the display device 102, and/or is about to be displayed on the display device 102.

A security classification module 806B may include any suitable hardware and/or software that can identify and/or determine a security classification of a plurality of security classifications for data and/or data content. A plurality of security classifications may include any suitable quantity of security classifications that can facilitate determining and/or identifying different values of importance and/or privacy between different data, different types of data, different data content, different types of data content, and/or different environments. In various embodiments, a plurality of security classifications includes a quantity of security classifications in the range of about two security classifications to about five security classifications, among other quantities of security classifications, ranges of quantities of security classifications, and/or ranges of security classifications that are possible and contemplated herein.

The plurality of security classifications, in various embodiments, includes a hierarchy of security classifications that indicates the importance and/or relative importance of data and/or data content and/or the level of privacy and/or security of a current environment. In various embodiments, a plurality of security classifications includes two security classifications, three security classifications, four security classifications, or five security classifications, among other quantities that are possible, as discussed elsewhere herein.

A security classification may be defined by any suitable criterion or criteria that can indicate the importance and/or relative importance of data, data content, one or more factors associated with the data and/or data content, and/or the actual or relative privacy and/or security of a current environment. In various embodiments, a security classification is determined and/or generated for data and/or data content based on a set of importance metrics generated for the data/data content and/or a set of environmental factors generated for a current environment.

In some embodiments, the security classification for data and/or data content generated by the security classification module 806B is determined by equally weighting the set of importance metrics generated for the data/data content and the set of environmental factors generated for a current environment. In additional or alternative embodiments, the security classification for data and/or data content generated by the security classification module 806B is determined by the higher of the two metric levels between the set of importance metrics generated for the data/data content and the set of environmental factors generated for a current environment. For example, if the set of importance metrics generated for the data/data content includes a high-level metric and the set of environmental factors generated for the current environment includes a low-level metric, a high security classification will be assigned to the data/data content. In another non-limiting example, if the set of importance metrics generated for the data/data content includes a low-level metric and the set of environmental factors generated for the current environment includes a medium-level metric, a medium security classification will be assigned to the data/data content.

In other embodiments, the security classification for data and/or data content generated by the security classification module 806B is determined by giving greater weight to the set of importance metrics generated for the data/data content than to the set of environmental factors generated for a current environment. In further embodiments, the security classification for data and/or data content generated by the security classification module 806B is determined by giving greater weight to the set of environmental factors generated for a current environment than to the set of importance metrics generated for the data/data content.

In some embodiments, a security classification is defined by one or more factors in the set of factors for the data and/or data content including a predefined, threshold, and/or relative level of importance metric. In other embodiments, a security classification is defined by one or more environmental factors in the set of environmental factors for the current environment including a predefined, threshold, and/or relative level of environmental metric. In further embodiments, a security classification is defined by one or more factors in the set of factors for the data and/or data content or one or more environmental factors in the set of environmental factors for the current environment including a predefined, threshold, and/or relative metric level.

In some embodiments, the security classification module 806B is configured to determine the security classification for a particular data and/or particular content of the data by analyzing the set of importance metrics and the set of environmental metrics and determining whether one or more importance metrics in the set of importance metrics matches the criteria or criterion defining a particular security classification. The security classification module 806B, in various embodiments, is configured to identify, determine, assign, and/or associate a particular security classification in the plurality of security classifications to data and/or to the content of the data in response to the set of importance metrics and/or the set of environmental metrics matching the criterion or criteria defining the particular security classification. In additional or alternative embodiments, the security classification module 806A is configured to identify, determine, assign, and/or associate a default, null, and/or non-level security classification to data and/or to the content of the data in response to the set of importance metrics and/or the set of environmental factors not matching the criterion or criteria defining any security classification in the plurality of security classifications.

In some embodiments, the security classification module 806A is configured to identify, determine, assign, and/or associate a security classification with the data on a data-by-data basis, as discussed elsewhere herein. In additional or alternative embodiments, the security classification module 806A is configured to identify, determine, assign, and/or associate a security classification with the data content on a content-by-content basis, as discussed elsewhere herein. As such, in various embodiments, two or more portions of the data may include different security classifications, two or more portions of the data content may include different security classifications, the data and the data content may include different security classifications, and/or at least one portion of the data includes a different security classification than at least one portion of the data content.

In some embodiments, the security classification module 806B and/or the security module 602B is/are configured to transmit the security classification for the data and/or the data content that is being displayed on the display device 102, is scheduled for display on the display device 102, and/or is about to be displayed on the display device 102 to the data obscuring module 604. Correspondingly, the data obscuring module 604 is configured to receive the security classification for the data and/or the data content from the security classification module 806B and/or the security module 602B and obscure display or freely display the data, one or more portions of the data, the data content, and/or one or more portions of the data content based on the security classification assigned/associated with the data, the one or more portions of the data, the data content, and/or the one or more portions of the data content.

With reference again to FIG. 6, a data obscuring module 604 may include any suitable hardware and/or software that can determine whether data and/or data content is to be selectively obscured, that can selectively obscure data and/ or data content, and/or that can selectively obscure data and/or data content on a display device 102. Selectively obscuring, in various embodiments, includes obscuring the display of data and/or data content or freely displaying data and/or data content.

In various embodiments, the data obscuring module 604 is configured to determine whether data is to be selectively obscured, selectively obscure the data, and/or facilitate selectively obscuring the data on a data-by-data basis. That is, data and/or each portion of the data can be obscured on a display device 102 on a data-by-data basis.

In additional or alternative embodiments, the data obscuring module 604 is configured to determine whether data content is to be selectively obscured, selectively obscure the data content, and/or facilitate selectively obscuring the data content on a content-by-content basis. That is, data content and/or each portion of the data content can be obscured on a display device 102 on a content-by-content basis.

In various embodiments, the data obscuring module 604 is configured to determine whether to selectively obscure, selectively obscure, and/or facilitate selectively obscuring data, one or more portions of the data, the content of the data, and/or one or more portions of the data content based on a policy for selectively obscuring data and/or data content, which can be referred to herein as, an obscuring policy. The obscuring policy may be based on any suitable criterion or criteria that can secure and/or protect data and/or data content from being viewed by unauthorized persons. The obscuring policy, in certain embodiments, includes a set of parameters corresponding to the criterion/criteria.

In various embodiments, the obscuring policy is based on the security classification assigned to and/or associated with data and/or data content. In additional or alternative embodiments, the obscuring policy includes a set of parameters based on the security classification for data and/or data content.

A set of parameters in the obscuring policy may include any quantity of parameters that can secure and/or protect important, valuable, privileged, and/or private data and/or data content by obscuring the data and/or data content to that the data and/or data content cannot be viewed by unauthorized persons. In some embodiments, the obscuring policy includes a parameter that provides and/or defines that data, each portion of the data, the content of the data, and/or each portion of the data content that includes a predetermined security classification, a security classification that is greater than a threshold security classification, or a security classification that is greater than or equal to the threshold security classification is/are to be obscured. In additional embodiments, the obscuring policy includes a parameters that provides and/or defines that data, each portion of the data, the content of the data, and/or each portion of the data content that includes a security classification other than the predetermined security classification, a security classification that is less than the threshold security classification, or a security classification that is less than or equal to the threshold security classification is/are to be freely displayed.

In determining whether data and/or data content is to be selectively obscured, the data obscuring module 604, in various embodiments, is configured to compare the security classification assigned to and/or associated with a particular data, each portion of the data, the content of the data, and/or each portion of the data content to the set of parameters in the obscuring policy to determine a match. The data obscuring module 604 is further configured to determine whether the data, each portion of the data, the content of the data, and/or each portion of the data content is to be selectively obscured in accordance with and/or consistent with the respective parameter that satisfies the obscuring policy (e.g., that matches and/or includes a corresponding security policy). That is, the data obscuring module 604 is configured to determine whether the data, each portion of the data, the content of the data, and/or each portion of the data content is to be obscured or freely displayed based on the condition(s) included in the respective parameter that satisfies the obscuring policy.

To selectively obscure and/or facilitate selectively obscuring data and/or data content, the data obscuring module 604, in various embodiments, is configured to compare the security classification assigned to and/or associated with a particular data, each portion of the data, the content of the data, and/or each portion of the data content to the set of parameters in the obscuring policy to determine a match. The data obscuring module 604 is further configured to selectively obscure and/or facilitate selectively obscuring the data, each portion of the data, the content of the data, and/or each portion of the data content in accordance with and/or consistent with the respective parameter that satisfies the obscuring policy (e.g., that matches and/or includes a corresponding security policy). That is, the data obscuring module 604 is configured to obscure or freely display and/or facilitate obscuring or freely displaying data, each portion of the data, the content of the data, and/or each portion of the data content is to be obscured or freely displayed based on the condition(s) included in the respective parameter that satisfies the obscuring policy.

In view of the foregoing discussion, it is clear that various embodiments of the obscuring module 604 are configured to determine whether to obscure or freely display data, determine whether to obscure or freely display each portion of the data, determine whether to obscure or freely display data content, and/or determine whether to obscure or freely display each portion of the data content based on the respective security classification assigned to and/or associated with the data, each portion of the data, the data content, and/or each portion of the data content. In a non-limiting example in which a parameter in the obscuring policy provides that data, each portion of the data, the data content, and/or each portion of the data content including a high or relatively high security classification (e.g., a predetermined and/or threshold security classification) are to be obscured, the data obscuring module 604 will determine that any data, each portion of any data, any data content, and/or each portion of any data content that includes the high or relatively high security classification is to be obscured. In another non-limiting example in which the obscuring policy further includes a parameter that provides that data, each portion of the data, the data content, and/or each portion of the data content including a security classification less than the predetermined and/or threshold security classification are to be freely displayed, the data obscuring module 604 will determine that each portion of any data, any data content, and/or each portion of any data content that includes a security classification that is less than the threshold security classification (e.g., a medium security classification, a low security classification, a relatively low security classification, a null security classification, and/or a non-security classification).

While the above discussion provides specific examples of parameters that may be included in an obscuring policy for determining whether data and/or data content is to be obscured and/or freely displayed that may be useful in understanding the scope and/or concepts described herein, these examples are not intended to limit the scope of the various embodiments of a parameter and/or an obscuring policy disclosed herein in any manner. That is, various embodiments of an obscuring policy may include additional, alternative, and/or other possible parameters that can form the basis for an obscuring policy, each of which is contemplated and included within the scope described herein.

In an additional non-limiting example, in response to determining/identifying that a first portion of data includes a security classification (e.g., a high, a relatively high, a medium-high, and/or medium security classification, etc.) that is greater than a threshold security classification (e.g., a medium-low security classification) provided in an obscuring policy parameter, the data obscuring module 604 will obscure and/or facilitate obscuring display of the first portion of the data. In a further non-limiting example, in response to determining that a second portion of the data includes a security classification (e.g., a medium-low security classification, a low security classification, a relatively low security classification, a null security classification, and/or a non-security classification) that is less than or equal to the threshold security classification, the data obscuring module 604 will freely display and/or facilitate freely displaying the second portion of the data.

While the above discussion provides specific examples of parameters that may be included in an obscuring policy for obscuring or freely displaying and/or facilitating obscuring or freely displaying data (and/or data content) that may be useful in understanding the scope and/or concepts described herein, these examples are not intended to limit the scope of the various embodiments of a parameter and/or an obscuring policy disclosed herein in any manner. That is, various embodiments of an obscuring policy may include additional, alternative, and/or other possible parameters that can form the basis for an obscuring policy, each of which is contemplated and included within the scope described herein.

Figure 9D:
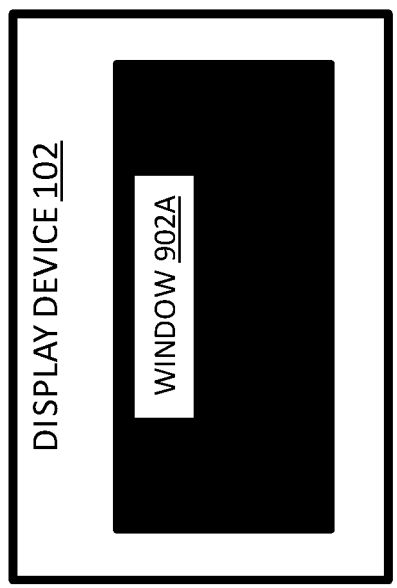
FIGS. 9A through 9O are schematic block diagrams illustrating various examples of data and/or data content being obscured on a displaying device in the computing systems of FIGS. 1 and 2 and the information handling devices of FIGS. 3 through 5.
Figure 9E:
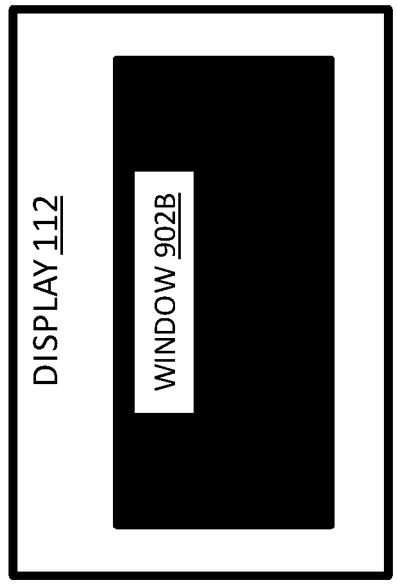
Figure 9F:
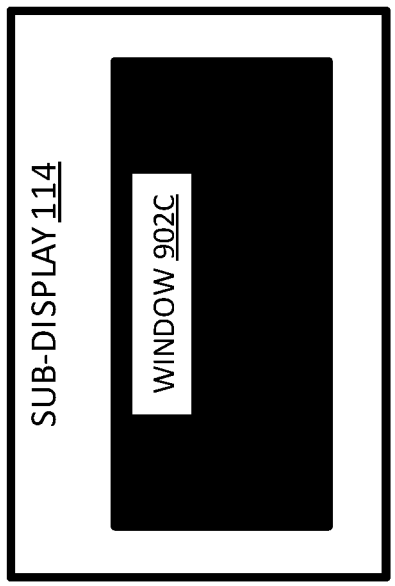
Figure 9K:
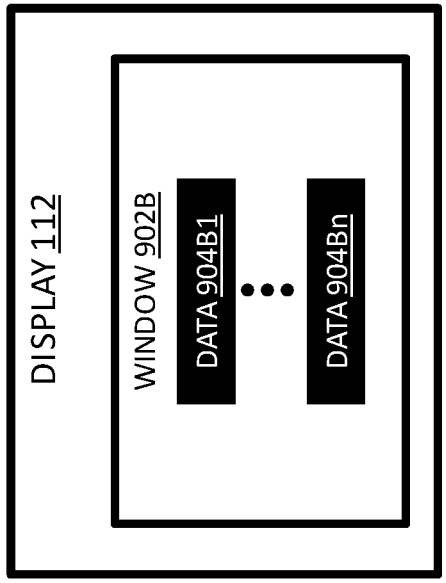
Figure 9J:
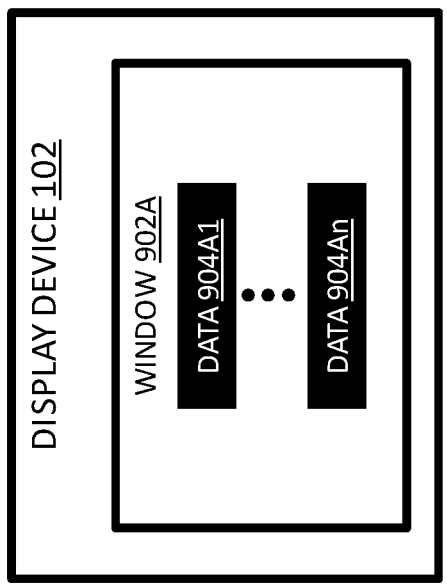
Figure 9L:
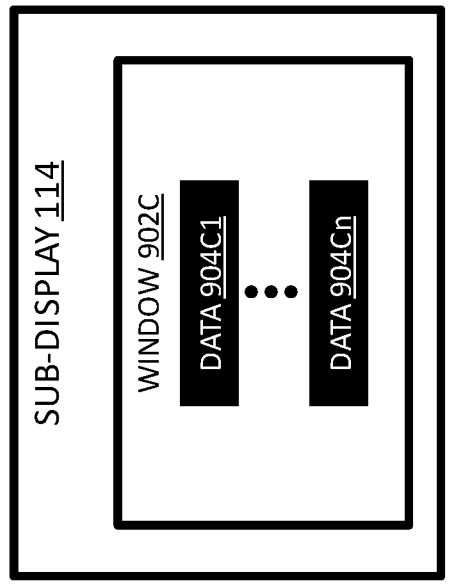
Figure 9O:
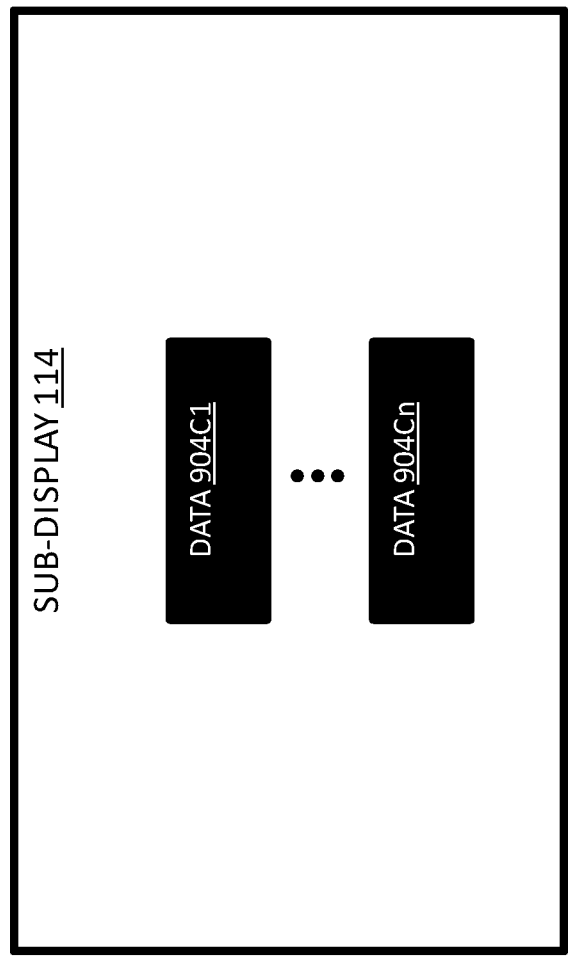

In some non-limiting examples that are also shown in FIGS. 9A though 9O, the data obscuring module 604 may determine, selectively obscure, and/or facilitate selectively obscuring the display of data on a display device 102 (see FIG. 9A), a display 112 (see FIGS. 3, 5, and 9B), a sub-display 114 (see FIGS. 5 and 9C), a window 902A of the display device 102 (see FIG. 9D), a window 902B of the display 112 (see FIG. 9E), a window 902C of the sub-display 114 (see FIG. 9F), the data 904A on the window 902A of the display device 102 (see FIG. 9G), the data 904B on the window 902B of the display 112 (see FIG. 9H), the data 904C on the window 902C of the sub-display 114 (see FIG. 9I), the data portions 904A1 through 904An on the window 902A of the display device 102 (see FIG. 9J), the data portions 904B1 through 904Bn on the window 902B of the display 112 (see FIG. 9K), the data portions 904C1 through 904Cn on the window 902C of the sub-display 114 (see FIG. 9L), the data portions 904A1 through 904An on the display device 102 (see FIG. 9M), the data portions 904B1 through 904Bn on the display 112 (see FIG. 9N), and/or the data portions 904C1 through 904Cn on the sub-display 114 (see FIG. 9O) based on the security classification assigned to and/or associated with the data. While FIGS. 9A through 9O are illustrated and discussed with reference to data 904 and portions of the data 904, the various embodiments are equally applicable to data content or the content of the data 904. That is, the determination of whether to obscure or freely display data content is performed on a content-by-content basis based on the security classification assigned to/associated with a particular data content or each respective portion of the data content.

In addition, various additional or alternative embodiments of an obscuring policy include a set of parameters that determine, selectively obscure (obscure or freely display), and/or facilitate selectively obscuring the data and/or data content based on a global security classification assigned to and/or associated with the data and/or data content. That is, in some embodiments, the respective security classification assigned to and/or associated with the data, the data content, each portion of the data, and each portion of the data content may each be considered a global security classification for the data and/or the data content that can be utilized as the basis for obscuring display the data and/or data content as a whole.

With reference again to FIGS. 9A through 9O, the data obscuring module 604 may determine, obscure, and/or facilitate obscuring the display of the data and/or the data content on a display device 102 (see FIG. 9A), a display 112 (see FIG. 9B), a sub-display 114 (see FIG. 9C), a window 902A on the display device 102 (see FIG. 9D), a window 902B on the display 112 (see FIG. 9E), window 902C on the sub-display 114 (see FIG. 9F), the data 904A on the window 902A of the display device 102 (see FIG. 9G), the data 904B on the window 902B of the display 112 (see FIG. 9H), the data 904C on the window 902C of the sub-display 114 (see FIG. 9I), the data portions 904A1 through 904An on the window 902A of the display device 102 (see FIG. 9J), the data portions 904B1 through 904Bn on the window 902B of the display 112 (see FIG. 9K), the data portions 904C1 through 904Cn on the window 902C of the sub-display 114 (see FIG. 9L), the data portions 904A1 through 904An on the display device 102 (see FIG. 9M), the data portions 904B1 through 904Bn on the display 112 (see FIG. 9N), and/or the data portions 904C1 through 904Cn on the sub-display 114 (see FIG. 9O) based on a single security classification (e.g., the security classification assigned to and/or associated with the data, the security classification assigned to and/or associated with the data content, the security classification assigned to and/or associated with any one of the portions of the data, or the security classification assigned to and/or associated with any one of the portions of the data content). While FIGS. 9A through 9O are illustrated and discussed with reference to data 904 and portions of the data 904, the various embodiments are equally applicable to data content or the content of the data 904. For example, all of the data and/or data content can be obscured in response to a security classification of a single data portion of data content satisfying a threshold security classification parameter of an obscuring policy.

In some embodiments, the single security classification may be the security classification assigned to and/or associated with a predetermined one of the data, data content, a particular portion of the data, or a particular portion of the data content. In other embodiments, the single security classification may be the security classification assigned to and/or associated with any one of the data, data content, any portion of the data, or any portion of the data content such that any assigned/associated security classification can be the basis of and/or trigger the entirety of the data and/or data content being obscured.

While various embodiments are shown in FIGS. 9A through 9O, various other embodiments and/or combinations of embodiments are possible, each of which is contemplated and included herein. That is, the scope of the various embodiments discussed herein are not limited by the examples illustrated in FIGS. 9A through 9O.

In various embodiments, the data obscuring module 604 is configured to determine, obscure or freely display, and/or facilitate obscuring or freely displaying data, each portion of the data, the content of the data, and/or each portion of the data content based on the respective security classification assigned to the data, each portion of the data, the content of the data, and/or each portion of the data content. That is, the data, each portion of the data, the content of the data, and/or each portion of the data content is obscured or freely displayed on a data-by-data basis and/or a content-by-content basis.

Figure 10B:
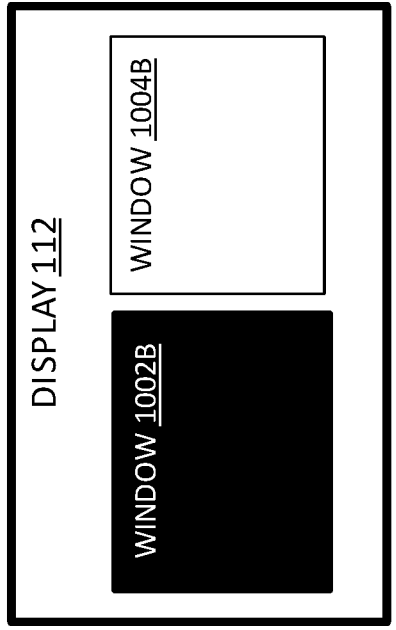
FIGS. 10A through 10O are schematic block diagrams illustrating various other examples of data and/or data content being obscured on a displaying device in the computing systems of FIGS. 1 and 2 and the information handling devices of FIGS. 3 through 5.
Figure 10A:
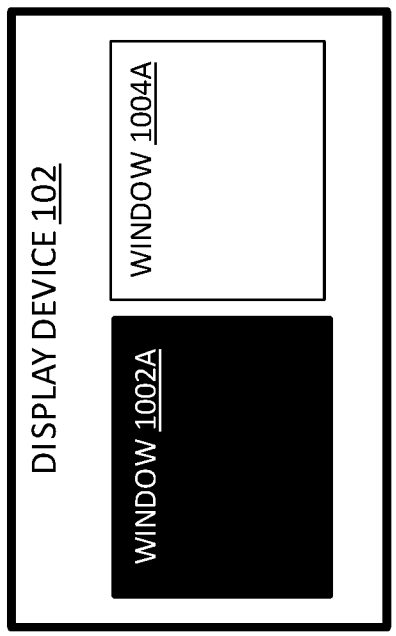
Figure 10C:
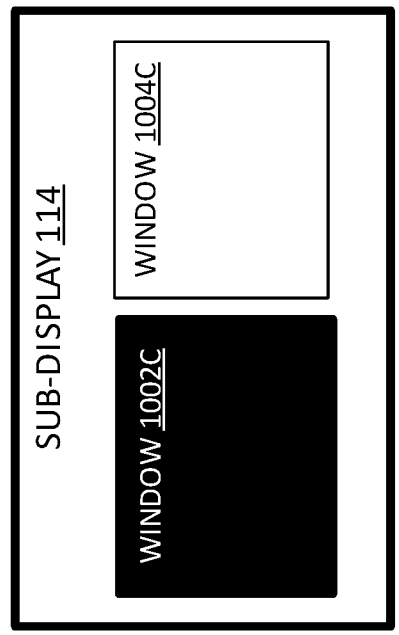
Figure 10F:
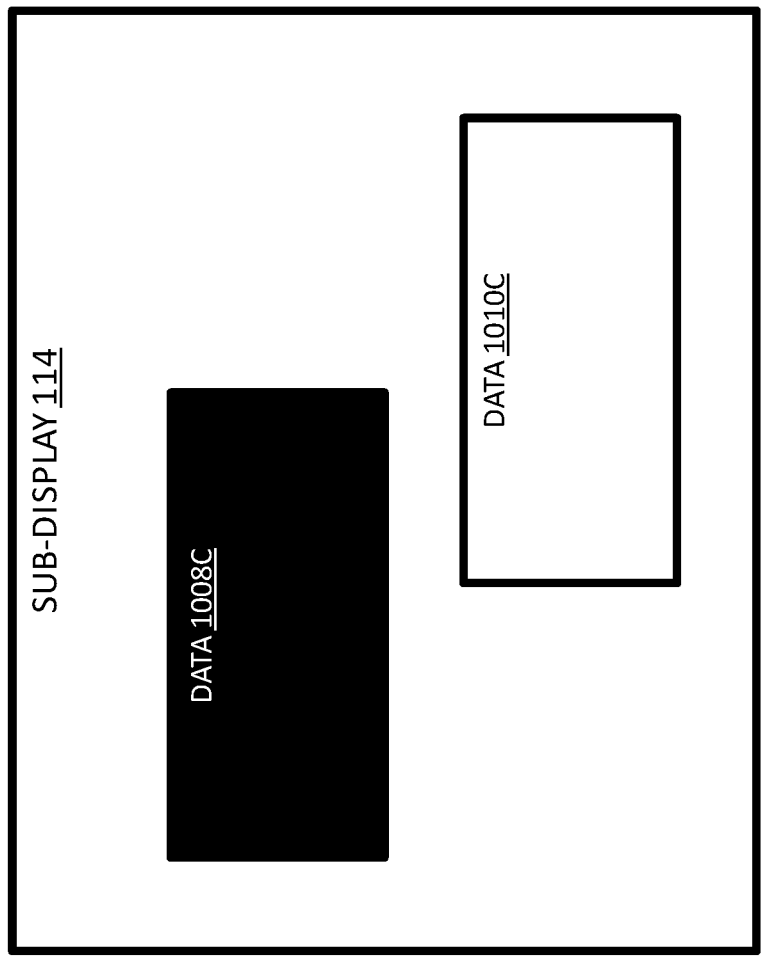
Figure 10H:
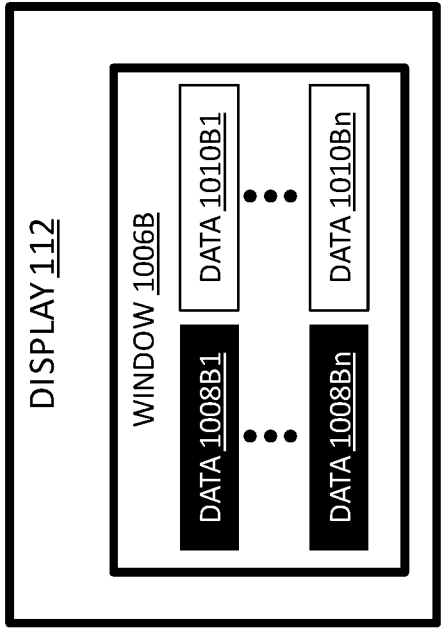
Figure 10G:
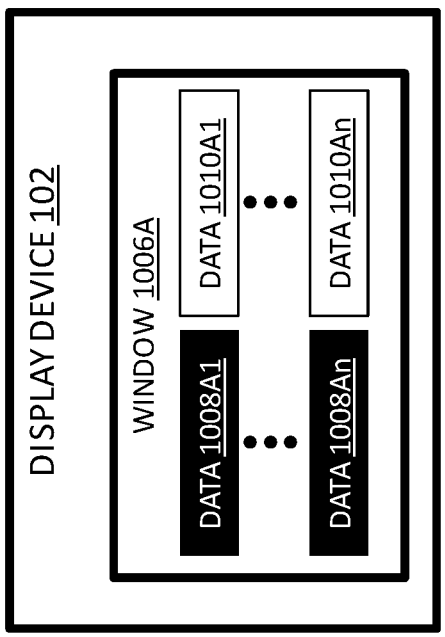
Figure 10I:
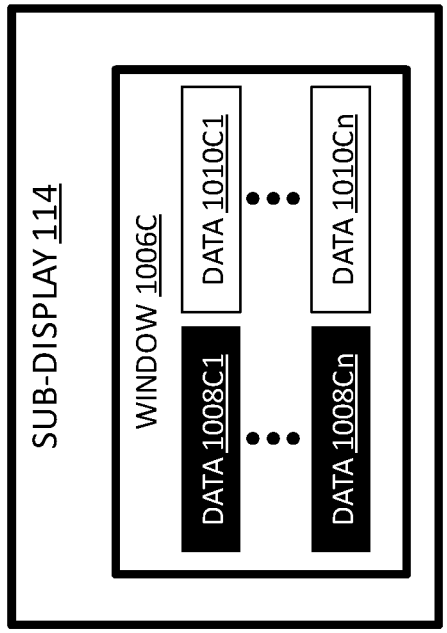
Figure 10K:
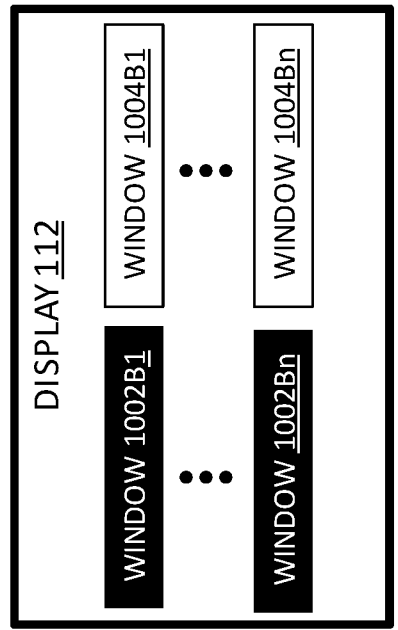
Figure 10J:
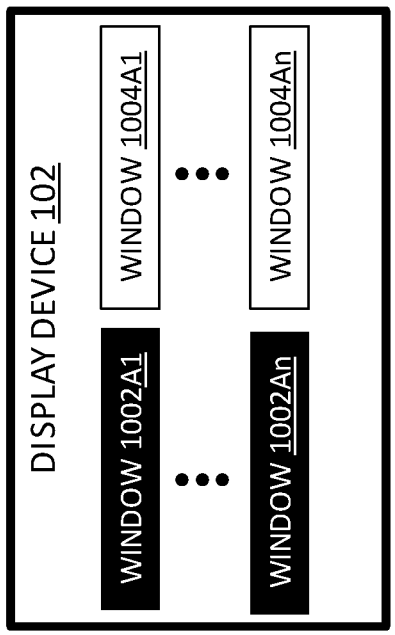
Figure 10L:
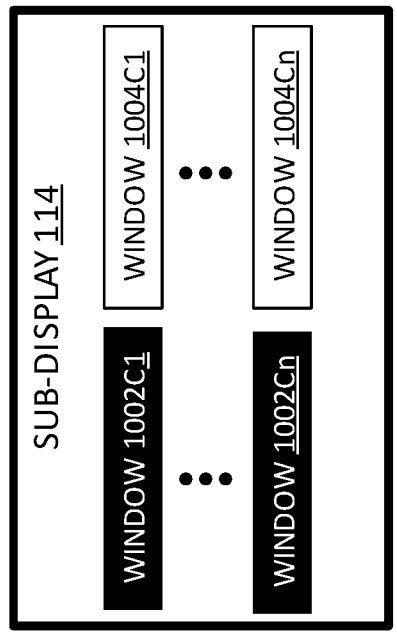
Figure 10M:
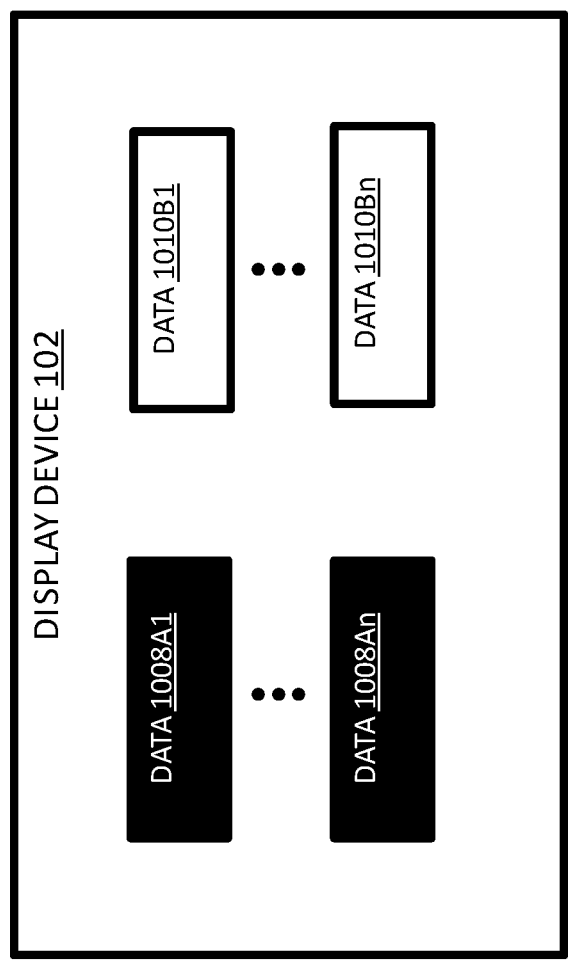
Figure 10N:
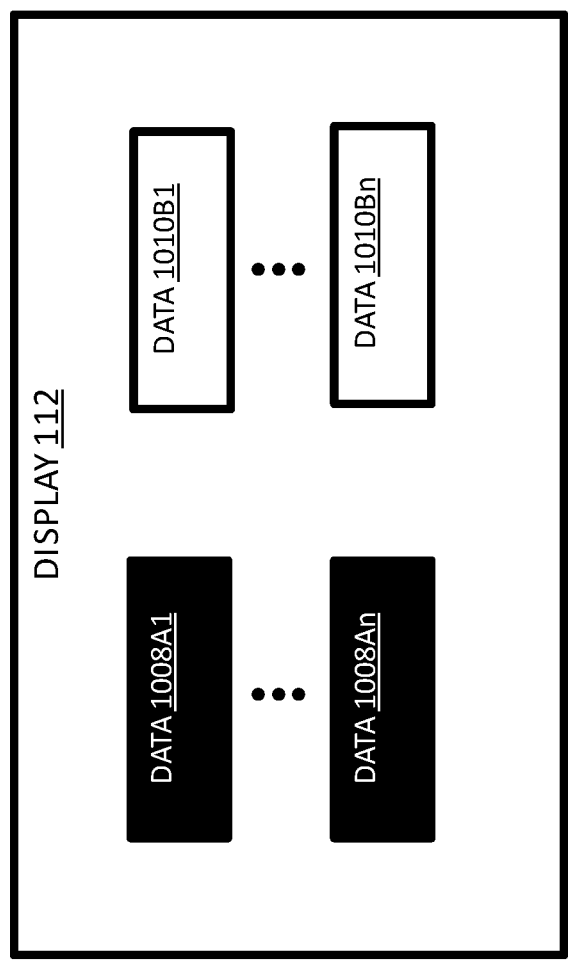
Figure 10O:
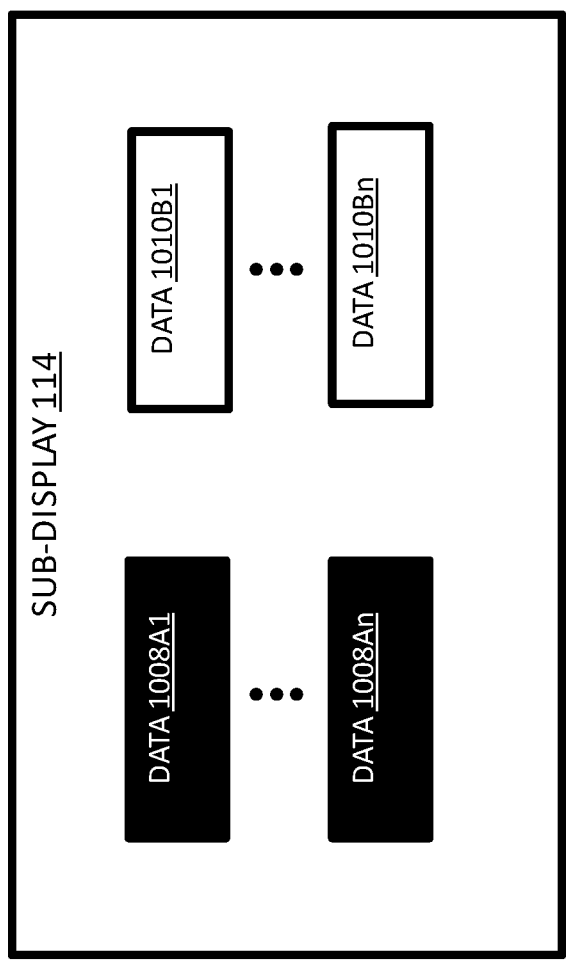

FIGS. 10A through 10O show various non-limiting examples of data being obscured or freely displayed on a data-by-data basis. As shown in FIGS. 10A through 10C, the data obscuring module 604 obscures display of the data on a window 1002A of a display device 102 and freely displays the data on another window 1004A of the display device 102 (see FIG. 10A), obscures display of the data on a window 1002B of a display 112 and freely displays the data on another window 1004B of the display 112 (see FIG. 10B), and obscures display of the data on a window 1002C of a sub-display 114 and freely displays the data on another window 1004C of the sub-display 114 (see FIG. 10C) based on the respective security classification for each individual data on the windows 1002A, 1002B, 1002C, 1004A, 1004B, and 1004C. In FIGS. 10D through 10F, the data obscuring module 604 obscures display of the data 1008A and freely displays the data 1010A on the display device 102 (see FIG. 10D), obscures display of the data 1008B and freely displays the data 1010B on the display 112 (see FIG. 10E), and obscures display of the data 1008C and freely displays the data 1010C on the sub-display 114 (see FIG. 10F) based on the respective security classification for each of the data 1008A, 1008B, 1008C, 1010A, 1010B, and 1010C. In FIGS. 10G through 10I, the data obscuring module 604 obscures display of the data 1008A1 through 1008An and freely displays the data 1010A1 through 1010An on a window 1006A of the display device 102 (see FIG. 10G), obscures display of the data 1008B1 through 1008Bn and freely displays the data 1010B1 through 1010Bn on a window 1006B of the display 112 (see FIG. 10H), and obscures display of the data 1008C1 through 1008Cn and freely displays the data 1010C1 through 1010Cn on a window 1006C of the sub-display 114 (see FIG. 10I) based on the respective security classification for each individual data portion 1008A1 through 1008An, 1008B1 through 1008Bn, 1008C1 through 1008Cn, 1010A1 through 1010An, 1010B1 through 1010Bn, and 1010C1 through 1010Cn. In FIGS. 10J through 10L, the data obscuring module 604 obscures display of the data in windows 1002A1 through 1002An and freely displays the data in windows 1004A1 through 1004An of the display device 102 (see FIG. 10J), obscures display of the data in windows 1002B1 through 1002Bn and freely displays the data in windows 1004B1 through 1004Bn of the display 112 (see FIG. 10K), and obscures display of the data in windows 1002C1 through 1002Cn and freely displays the data in windows 1004C1 through 1004Cn of the sub-display 114 (see FIG. 10L) based on the respective security classification for each data on windows 1002A1 through 1002An, 1002B1 through 1002Bn, 1002C1 through 1002Cn, 1004A1 through 1004An, 1004B1 through 1004Bn, and 1004C1 through 1004Cn. In FIGS. 10M through 10O, the data obscuring module 604 obscures display of the data 1008A1 through 1008An and freely displays the data 1010A1 through 1010An on the display device 102 (see FIG. 10M), obscures display of the data 1008B1 through 1008Bn and freely displays the data 1010B1 through 1010Bn on the display 112 (see FIG. 10N), and obscures display of the data 1008C1 through 1008Cn and freely displays the data 1010C1 through 1010Cn on the sub-display 114 (see FIG. 10O) based on the respective security classification for each individual data portion 1008A1 through 1008An, 1008B1 through 1008Bn, 1008C1 through 1008Cn, 1010A1 through 1010An, 1010B1 through 1010Bn, and 1010C1 through 1010Cn. While FIGS. 10A through 10O are illustrated and discussed with reference to data 1008, portions of the data 1008, data 1010, and portions of the data 1010, the various embodiments are equally applicable to the content of the data 1008 and/or the content of the data 1010.

While various examples are shown in FIGS. 10A through 10O, various other examples and/or combinations are possible, each of which is contemplated and included herein. That is, the scope of the various embodiments discussed herein are not limited by the examples illustrated in FIGS. 10A through 10O.

Specifically, the examples of FIGS. 10A through 10O show that the data obscuring module 604, in some embodiments, is configured to obscure the display of one or more first portions of data and freely display one or more second portions of the data based on the security classification assigned to and/or associated with each respective portion of the data. In other embodiments, the data obscuring module 604 is configured to obscure the display of one or more first portions of data content and freely display one or more second portions of the data content based on the security classification assigned to and/or associated with each respective portion of the data content. The data obscuring module 604 is configured to obscure or freely display the data, portions of the data, the data content, and/or portions of the data on a display device 102 (see e.g., FIG. 1), two or more display devices 102 (see e.g., display devices 102A through 102n in FIG. 2), a display 112 (see e.g., FIG. 3), two or more displays 112 (see e.g., displays 112A through 112n in FIG. 4), a sub-display 114 (see e.g., FIG. 5), and/or a display 112 and a sub-display 114 (see e.g., FIG. 5).

In additional or alternative embodiments, the data obscuring module 604 is configured to selectively obscure data and/or data content on two or more display devices 102A through 102n (e.g., a data obscuring module 604 included in the processor 108B and/or stored in the memory device(s) 106), two or more displays 112 (e.g., a data obscuring module 604 included in the processor 108D and/or stored in the memory device(s) 106), and/or a display 112 and a sub-display 114 (e.g., a data obscuring module 604 included in the processor 108E and/or stored in the memory device(s) 106). That is, the data obscuring module 604, in various embodiments, is configured to selectively obscure data and/or data content on a device-by-device basis. In other words, data and/or portions thereof can be obscured or freely displayed on a data-by-data basis and/or data content and/or portions thereof can be obscured or freely displayed on a content-by-content basis on various devices on a device-by-device basis. As such, data and/or data content may be obscured on one or more displaying devices while the same data and/or data content is being freely displayed on one or more other displaying devices.

While the various examples shown in FIGS. 10A through 10O and discussed above are made is reference to obscuring and/or freely displaying data and/or data content, FIGS. 10A through 10O and the discussion above are not limited to obscuring and freely displaying data and/or data content. That is, the various examples in FIGS. 10A through 10O equally apply to the operations of determining whether to obscure or freely display data and/or data content and to facilitating obscuring or freely displaying data and/or data content performed by a data obscuring module 604.

Figure 11B:
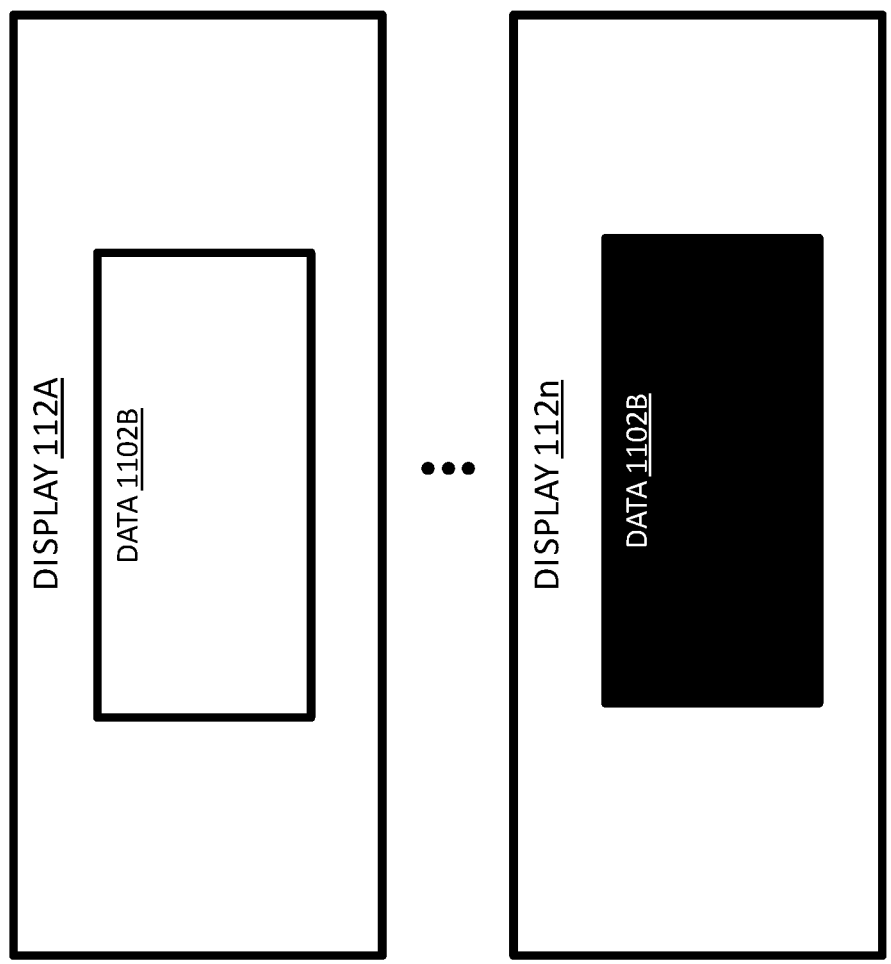

FIGS. 11A through 11F show various non-limiting examples of data being obscured or freely displayed on a device-by-device basis. As shown in FIGS. 11A through 11C, the data 1102A is obscured on the display device 102A and freely displayed on the display device 102n (see FIG. 11A), the data 1102B is freely displayed on the display 112A and obscured on the display 112n (see FIG. 11B), and the data 1102C is obscured on the display 112 and freely displayed on the sub-display 114 (see FIG. 11C). In FIG. 11A, the data 1102A may be obscured on the display device 102A and freely displayed on the display device 102n in response to, for example, the display devices 102A and 102n being located in different environments, among other factors that are possible and contemplated herein. In FIG. 11B, the data 1102B may be obscured on the display 112n and freely displayed on the display 112A in response to, for example, the displays 112A and 112n being positioned at different locations on the information handling device 104D (e.g., the location of the display 112A is less conducive to shoulder surfing, includes a smaller viewing angle, etc.), among other factors that are possible and contemplated herein. In FIG. 11C, the data 1102C may be freely displayed on the sub-display 114 in response to, for example, the sub-display 114 including a small size and/or a smaller size relative to the display 112, among other factors that are possible and contemplated herein.

Figure 11D:
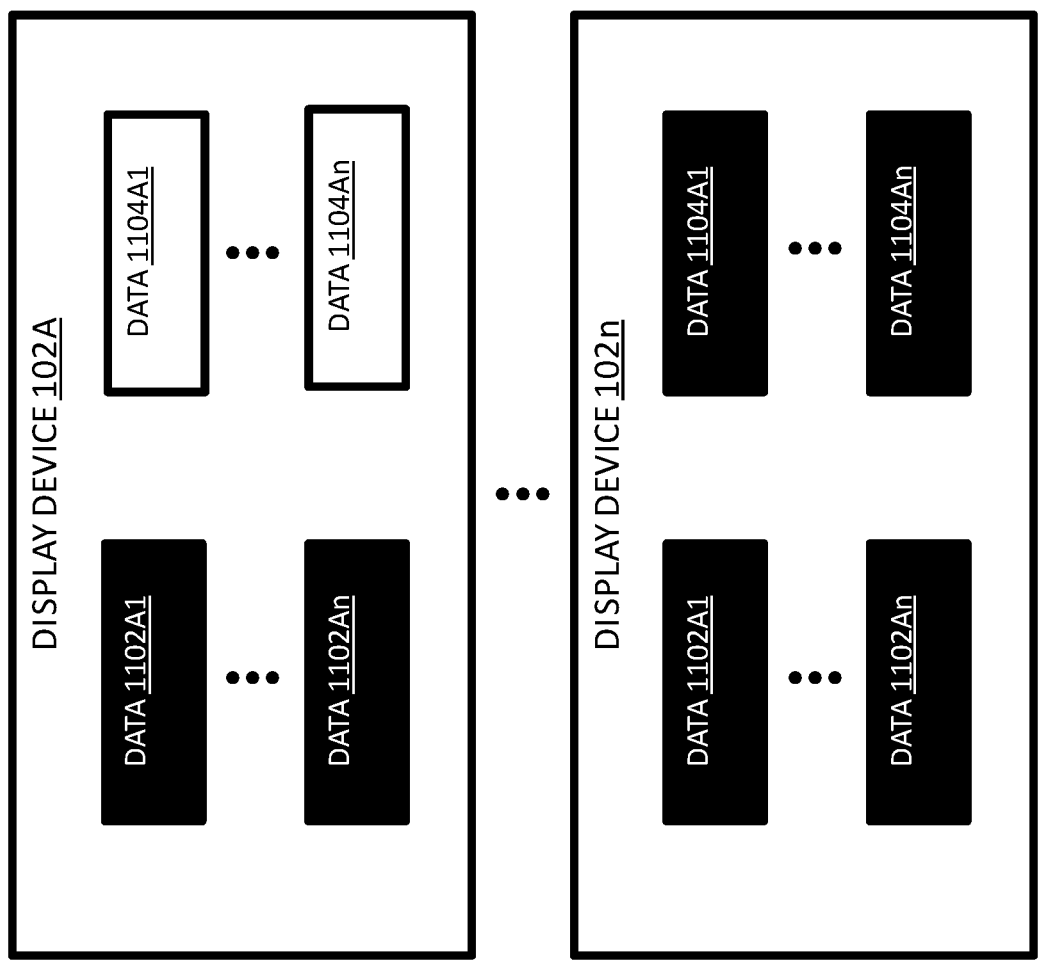

As shown in the example of FIG. 11D, the data 1102A1 through 1102An is obscured on both of display devices 102A and 102n and the data 1104A1 through 1104An is freely displayed on the display device 102A and obscured on the display device 102n. In FIG. 11D, the data 1102A1 through 1102An is obscured on the display device 102A in accordance with the security classification assigned to and/or associated with each respective data and/or portion of the data 1102A1 through 1102An, which security classification is based on the set of importance metrics associated with each respective data and/or portion of the data 1102A1 through 1102An and/or the set of environmental metrics for the environment within which the display device 102A currently resides, as discussed elsewhere herein. Further, the data 1104A1 through 1104An is freely displayed on the display device 102A in accordance with the security classification assigned to and/or associated with each respective data and/or portion of the data 1104A1 through 1104An, which security classification is based on the set of importance metrics associated with each respective data and/or portion of the data 1104A1 through 1104An and/or the set of environmental metrics for the environment within which the display device 102A currently resides, as discussed elsewhere herein. In addition, the data 1102A1 through 1102An is obscured on the display device 102n in accordance with the security classification assigned to and/or associated with each respective data and/or portion of the data 1102A1 through 1102An, which security classification is based on the set of importance metrics associated with each respective data and/or portion of the data 1102A1 through 1102An and/or the set of environmental metrics for the environment within which the display device 102n currently resides, as discussed elsewhere herein. Moreover, the data 1104A1 through 1104An is obscured on the display device 102n in accordance with the security classification assigned to and/or associated with each respective data and/or portion of the data 1104A1 through 1104An, which security classification is based on the set of importance metrics associated with each respective data and/or portion of the data 1104A1 through 1104An and/or the set of environmental metrics for the environment within which the display device 102n currently resides, as discussed elsewhere herein.

Figure 11E:
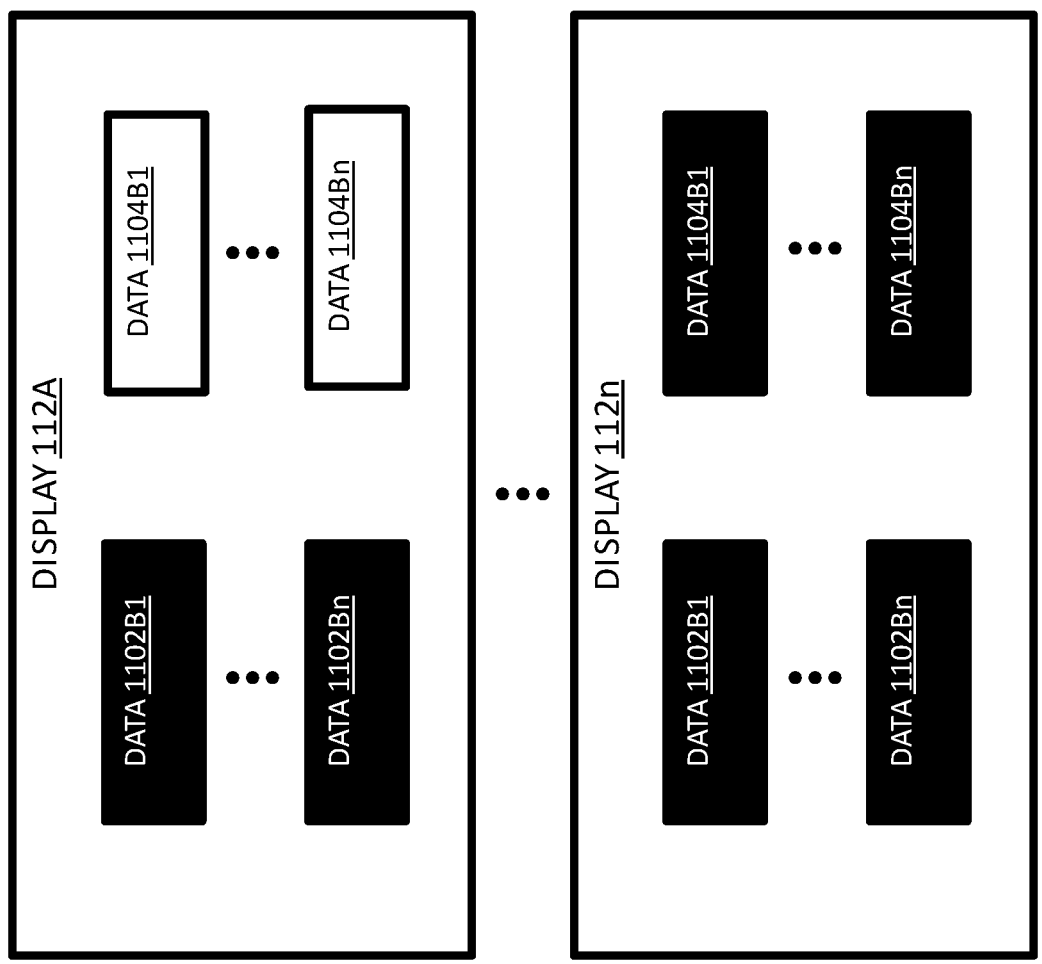

The example of FIG. 11E shows that the data 1102B1 through 1102Bn is obscured on both of displays 112A and 112n and the data 1104B1 through 1104Bn is freely displayed on the display 112A and obscured on the display 112n. Similar to the discussion above with reference to FIG. 11D, the data 1102B1 through 1102Bn is obscured on both of the displays 112A and 112n in accordance with the particular security classification assigned to and/or associated with each respective data and/or portion of the data 1102B1 through 1102Bn, which security classifications are each based on the set of importance metrics for each respective data and/or portion of the data 1102B1 through 1102Bn and/or the set of environmental metrics for the respective environments within which the displays 112A and 112n currently reside, as discussed elsewhere herein. Similarly, the data 1104B1 through 1104Bn is freely displayed on the display 112A and obscured on the display 112n in accordance with the particular security classification assigned to and/or associated with each respective data and/or portion of the data 1104B1 through 1104Bn, which security classifications are each based on the set of importance metrics for each respective data and/or portion of the data 1104B1 through 1104Bn and/or the set of environmental metrics for the respective environments within which the displays 112A and 112n currently reside, as discussed elsewhere herein.

Figure 11F:
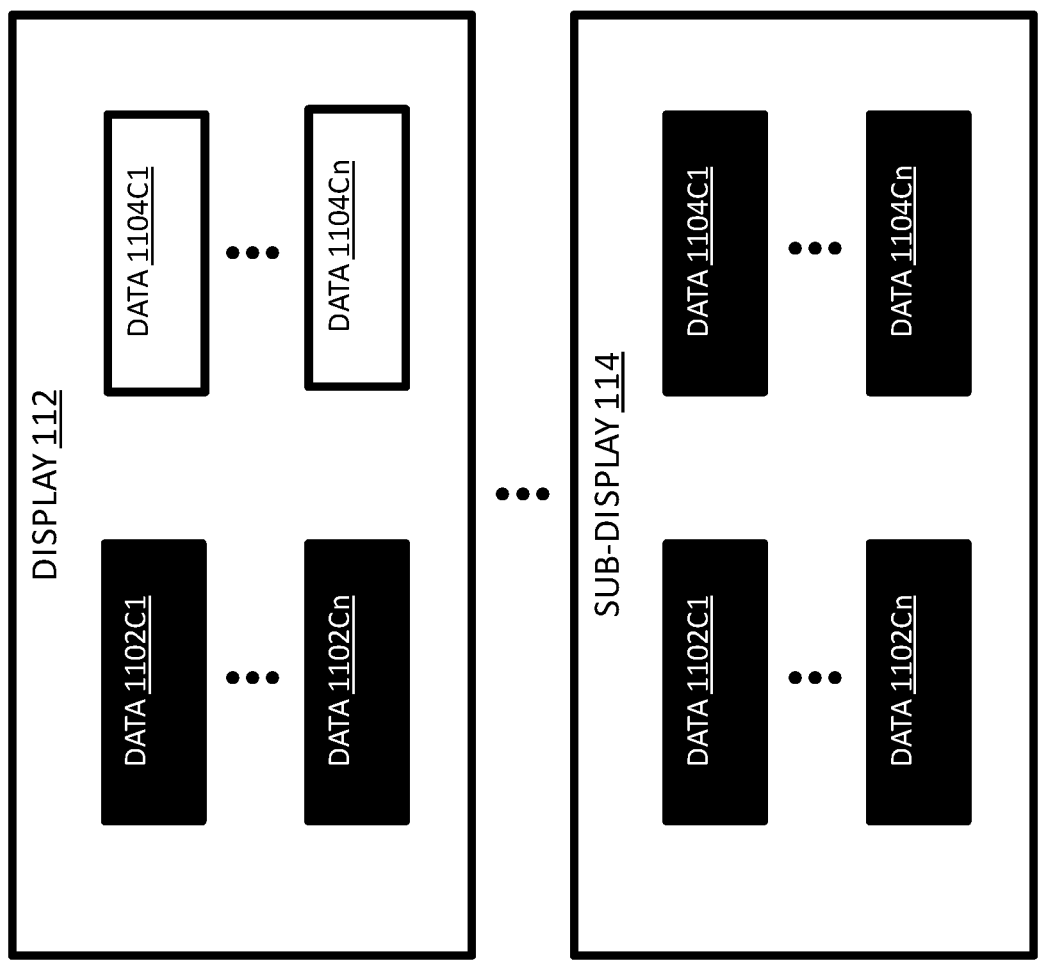

As shown in the example of FIG. 11F, the data 1102C1 through 1102Cn is obscured on the display 112 and on the sub-display 114 and the data 1104B1 through 1104Bn is freely displayed on the display 112 and obscured on the sub-display 114. Similar to the discussions above with reference to FIGS. 11D and 11E, the data 1102C1 through 1102Cn is obscured the display 112 and on the sub-display 114 in accordance with the particular security classification assigned to and/or associated with each respective data and/or portion of the data 1102C1 through 1102Cn, which security classifications are each based on the set of importance metrics for each respective data and/or portion of the data 1102C1 through 1102Cn and/or the set of environmental metrics for the respective environments within which the display 112 and the sub-display 114 currently reside, as discussed elsewhere herein. Similarly, the data 1104C1 through 1104Cn is freely displayed on the display 112 and obscured on the sub-display 114 in accordance with the particular security classification assigned to and/or associated with each respective data and/or portion of the data 1104C1 through 1104Cn, which security classifications are each based on the set of importance metrics for each respective data and/or portion of the data 1104C1 through 1104Cn and/or the set of environmental metrics for the respective environments within which the display 112 and the sub-display 114 currently reside, as discussed elsewhere herein.

As discussed above, various embodiments of the data obscuring module 604 is/are configured to selectively obscure (e.g., obscuring or freely displaying) the display of data and/or data content based the security classification assigned to/associated with the data, each respective portion of the data, the data content, and/or each respective portion of the data content and a data-by-data basis and/or a content-by-content basis. Further, some embodiments of the data obscuring module 604 is/are configured to selectively obscure the display of data and/or data content on a device-by-device basis.

While the various examples shown in FIGS. 11A through 11F and discussed above are made is reference to obscuring and/or freely displaying data and/or data content, FIGS. 11A through 11F and the discussion above are not limited to obscuring and freely displaying data and/or data content. That is, the various examples in FIGS. 11A through 11F equally apply to the operations of determining whether to obscure or freely display data and/or data content and to facilitating obscuring or freely displaying data and/or data content performed by a data obscuring module 604.

In various embodiments, the data obscuring module 604 is configured to transmit a command including the determination to selectively obscure the data and/or data content to the display device 102 (or the display devices 102A through 102n (see FIG. 2), the display 112 (see FIG. 3), the displays 112A through 112n (see FIG. 4), or the display 112 and the sub-display 114 (see FIG. 5)). In some embodiments, the command includes a set of instructions that causes the display device 102 to obscure data, one or more portions of the data, content of the data, and/or one or more portions of the data content on a data-by-data basis and/or a content-by-content basis. In additional embodiments, the command further includes a set of instructions that causes the display device 102 to freely display the data, one or more portions of the data, the content of the data, and/or one or more portions of the data content on a data-by-data basis and/or a content-by-content basis. In this manner, the data obscuring module 604, in some embodiments, is configured to facilitate obscuring and/or freely displaying the data, one or more portions of the data, the content of the data, and/or one or more portions of the data content on a data-by-data basis and/or a content-by-content basis, in addition to performing the determination to selectively obscure data and/or data content.

The data obscuring module 604, in various embodiments, is configured to selectively obscure (e.g., obscure and/or freely display) data and/or data content by transmitting a display command the display device 102. In some embodiments, the display command obscures data, one or more portions of the data, content of the data, and/or one or more portions of the data content on the display device 102 on a data-by-data basis and/or a content-by-content basis. In additional embodiments, the display command further freely displays the data, one or more portions of the data, the content of the data, and/or one or more portions of the data content on the display device 102 on a data-by-data basis and/or a content-by-content basis.

The data obscuring module 604 is configured to obscure the data, data content, the portions of the data, and/or the portions of the data content utilizing any algorithm, method, and/or technique that is known or developed in the future that can conceal data, keep data from being seen by a human, and/or prevent data from being visible by a human. In various embodiments, obscuring data and/or portions of the data include obscuring the data itself or portions of the data, obscuring a window or portion(s) of the window, and/or obscuring a screen or portion(s) of the screen. Examples of obscuring data and/or portions of the data include, but are not limited to, blacking out, graying out, blurring out, fuzzing out, modifying a size (e.g., making smaller, shrinking, making extremely large, etc.), jumbling, scrambling, narrowing a viewing angle, data masking, data obfuscation, and/or encryption, etc., among other examples that can conceal data, keep data from being seen by a human, and/or prevent data from being visible by a human that are possible and contemplated herein.

Figure 12:
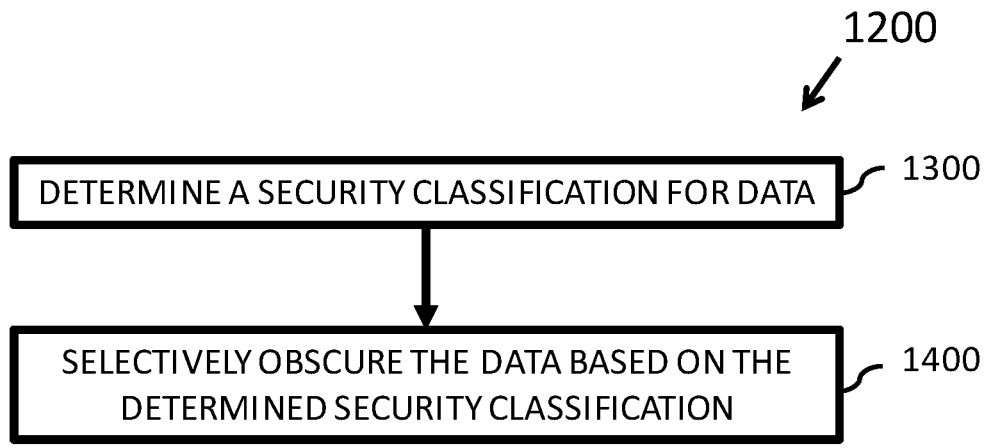
FIG. 12 is a schematic flow chart diagram illustrating one embodiment of a method for selectively obscuring data and/or data content.

FIG. 12 is a schematic flow chart diagram illustrating one embodiment of a method 1200 for selectively obscuring data and/or data content. At least in the illustrated embodiment, the method 1200 begins by a processor 108 determining a security classification for data (block 1300). The data may include a particular data, a portion of the data, the content of the data, or a portion of the data content.

The method 1200 further includes selectively obscuring the display of the data based on the determined security classification for the data (block 1400). The data may be selectively obscured on one or more displaying devices (e.g., a display device 102, a set of display devices 102A through 102n, a display 112, a set of displays 112A through 112n, or a display 112 and a sub-display 114), as discussed elsewhere herein. The method 1200 may end or the processor 108 may wait for subsequent data to be displayed on the displaying device(s) and repeat the method 1200.

Figure 13A:
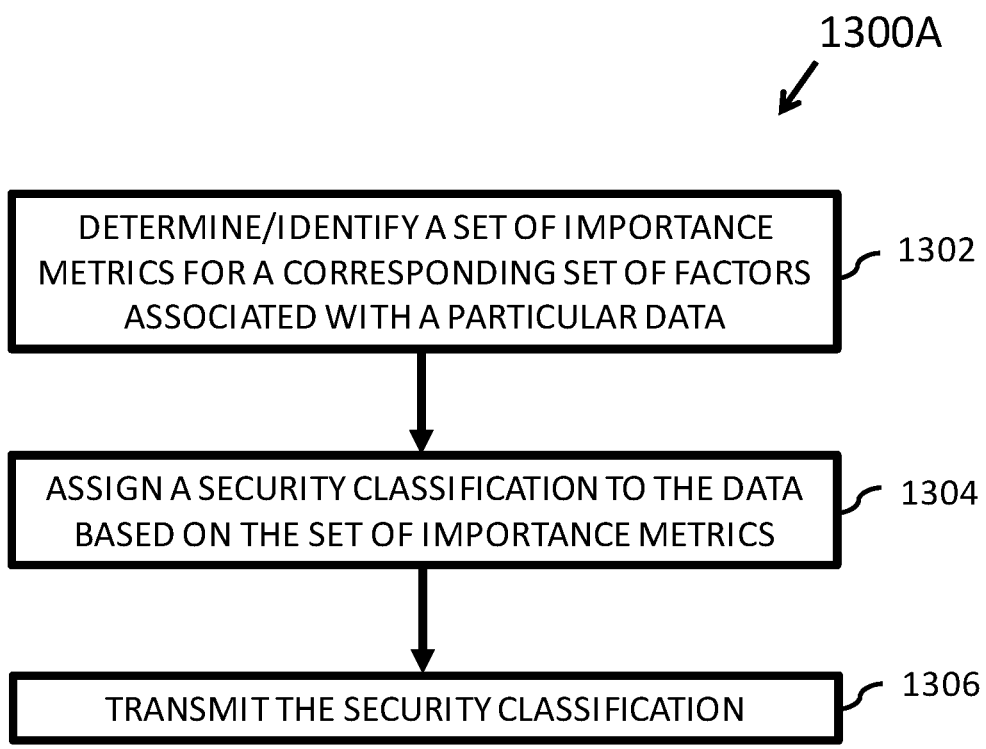
FIG. 13A is a schematic flow chart diagram illustrating one embodiment of a method for determining and/or identifying a security classification for data and/or data content that may be included in the method of FIG. 12.

FIG. 13A is a schematic flow chart diagram illustrating one embodiment of a method 1300A for determining a security classification. The method 1300A, in some embodiments, is included as a portion of the method 1200 discussed above.

At least in the illustrated embodiment, the method 1300A begins by a processor 108 determining and/or identifying a set of importance metrics for a corresponding set of factors associated with data (block 1302). The data may include a particular data, a portion of the data, the content of the data, or a portion of the data content. Further, the set of factors may include any suitable factor or factors associated with the data, as discussed elsewhere herein. In addition, the set of importance metrics may be determined/identified utilizing any of the embodiments, techniques, and/or methods for determining and/or identifying a set of importance factors discussed elsewhere herein.

The processor 108, in various embodiments, assigns a security classification to the data based on the determined/identified set of importance metrics for the corresponding set of factors associated with the data (block 1304). The security classification may be assigned to the data based on and/or utilizing any of the embodiments, techniques, and/or methods for assigning a security level to data based on the determined/identified set of importance metrics for the corresponding set of factors associated with the data discussed elsewhere herein.

In some embodiments, the processor 108 transmits the security level for the data to a component that can selectively obscure the data on one or more displaying devices (e.g., a display device 102, a set of display devices 102A through 102n, a display 112, a set of displays 112A through 112n, or a display 112 and a sub-display 114) (block 1306). The component (e.g., a data obscuring module 604) may be within the processor 108 and/or within one or more memory devices 106. The method 1300A may end or the processor 108 may wait for subsequent data to be displayed on the displaying device(s) and repeat the method 1300A.

Figure 13B:
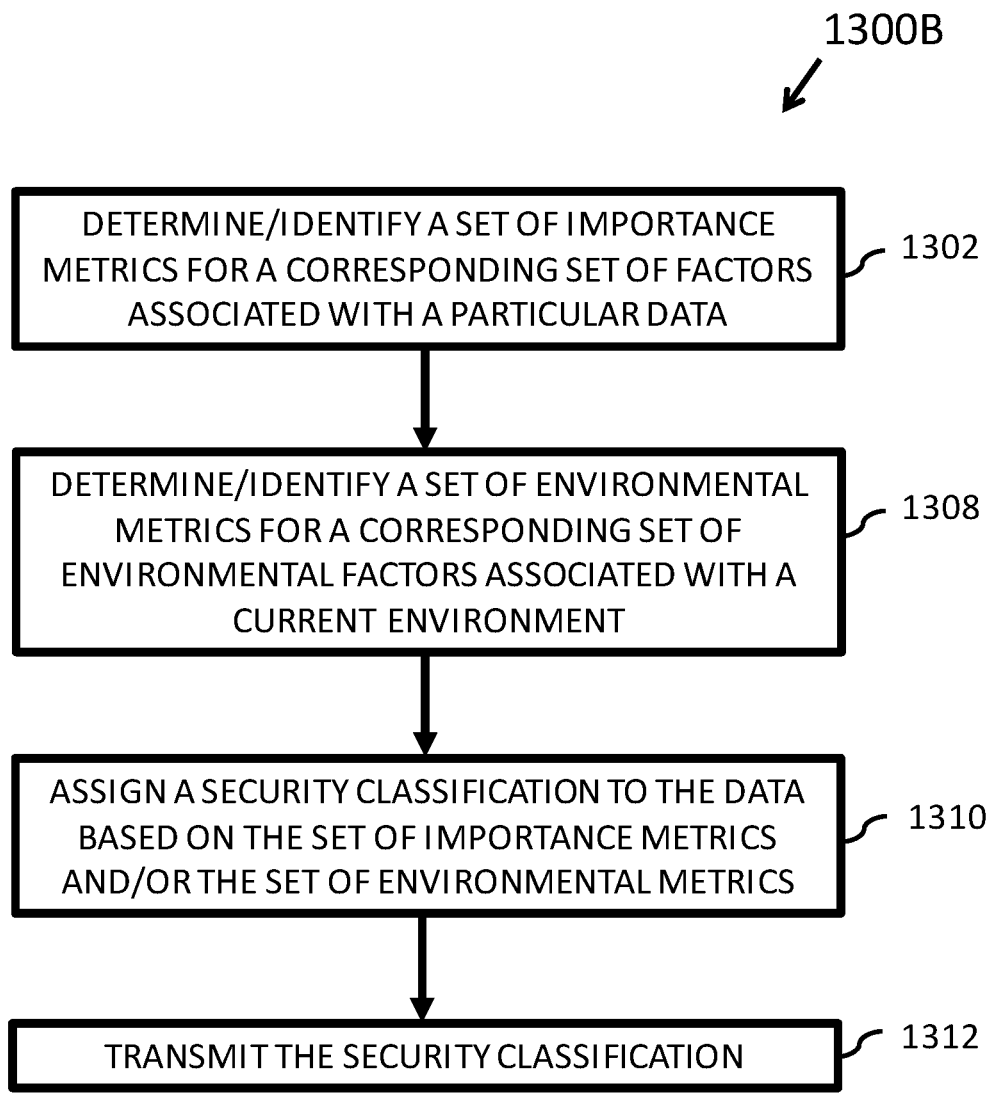
FIG. 13B is a schematic flow chart diagram illustrating another embodiment of a method for determining and/or identifying a security classification for data and/or data content that may be included in the method of FIG. 12.

FIG. 13B is a schematic flow chart diagram illustrating another embodiment of a method 1300B for determining a security classification. The method 1300B, in some embodiments, is included as a portion of the method 1200 discussed above.

At least in the illustrated embodiment, the method 1300B begins by a processor 108 determining and/or identifying a set of importance metrics for a corresponding set of factors associated with data (block 1302). The data may include a particular data, a portion of the data, the content of the data, or a portion of the data content. Further, the set of factors may include any suitable factor or factors associated with the data, as discussed elsewhere herein. In addition, the set of importance metrics may be determined/identified utilizing any of the embodiments, techniques, and/or methods for determining and/or identifying a set of importance factors discussed elsewhere herein.

The processor 108 further determines and/or identifies a set of environmental metrics for a corresponding set of environmental factors associated with the current environment (block 1308). The current environment may include the environment within which each respective displaying device currently resides.

The data may include a particular data, a portion of the data, the content of the data, or a portion of the data content. Further, the set of factors may include any suitable factor or factors associated with the data, as discussed elsewhere herein. In addition, the set of importance metrics may be determined/identified utilizing any of the embodiments, techniques, and/or methods for determining and/or identifying a set of importance factors discussed elsewhere herein.

The processor 108, in various embodiments, assigns a security classification to the data based on the determined/identified set of importance metrics for the corresponding set of factors associated with the data and/or the determined/identified set of environmental metrics for the current environment (block 1310). The security classification may be assigned to the data based on and/or utilizing any of the embodiments, techniques, and/or methods for assigning a security level to data based on the determined/identified set of importance metrics for the corresponding set of factors associated with the data and/or the determined/identified set of environmental metrics for the current environment discussed elsewhere herein.

In some embodiments, the processor 108 transmits the security level for the data to a component that can selectively obscure the data on one or more displaying devices (e.g., a display device 102, a set of display devices 102A through 102n, a display 112, a set of displays 112A through 112n, or a display 112 and a sub-display 114) (block 1312). The component (e.g., a data obscuring module 604) may be within the processor 108 and/or within one or more memory devices 106. The method 1300B may end or the processor 108 may wait for subsequent data to be displayed on the displaying device(s) and repeat the method 1300B.

Figure 14:
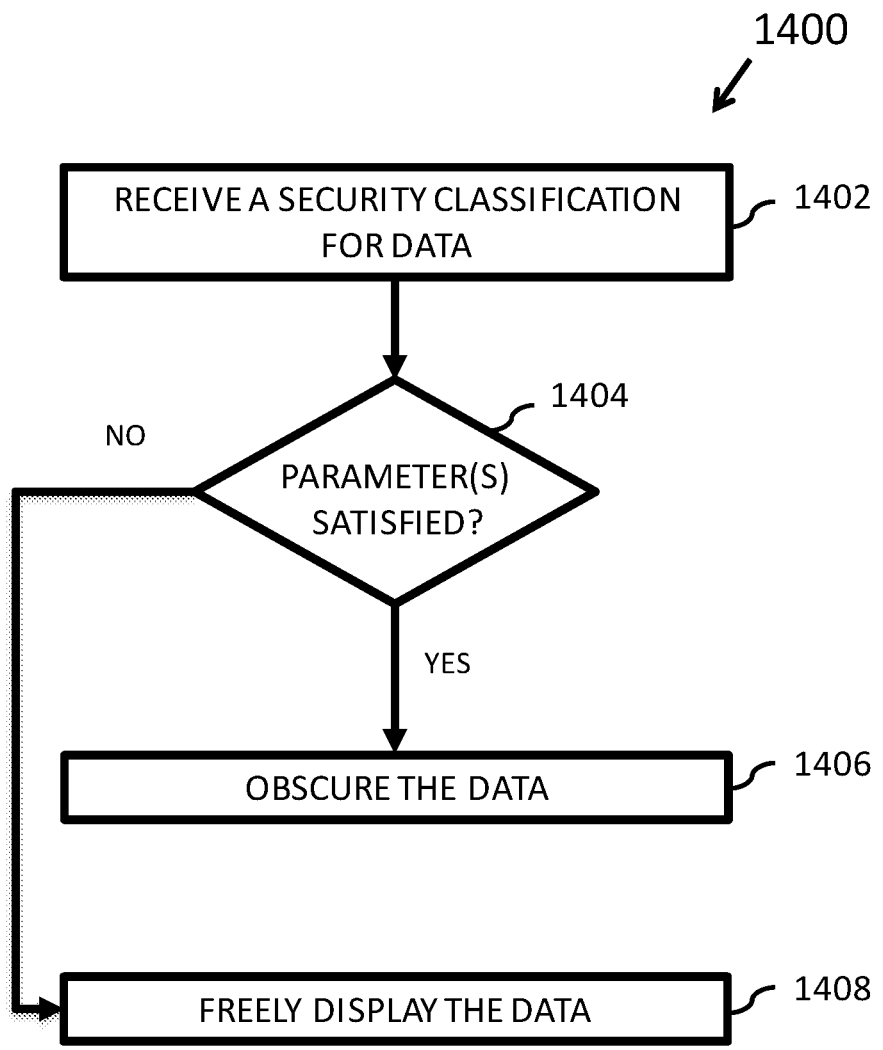
FIG. 14 is a schematic flow chart diagram illustrating one embodiment of a method for selectively obscuring data and/or data content that may be included in the method of FIG. 12.

FIG. 14 is a schematic flow chart diagram illustrating one embodiment of a method 1400 for selectively obscuring data. The method 1400, in some embodiments, is included as a portion of the method 1200 discussed above.

At least in the illustrated embodiment, the method 1400 begins by a processor 108 receiving a security classification for data from a component that determined/identified the security classification (block 1402). The data may include a particular data, a portion of the data, the content of the data, or a portion of the data content. Further, the component (e.g., a security module 602, a security module 602A, and a security module 602B) may be within the processor 108 and/or within one or more memory devices 106.

The processor 108 determines whether the security classification for the data satisfies one or more parameters in a set of parameters of an obscuring policy (block 1404). In some embodiments, the obscuring policy is based on the security classification determined for data. Further, the parameter(s) may be satisfied utilizing any of the embodiments, techniques, and/or methods for satisfying one or more parameters in a set of parameters of an obscuring policy discussed elsewhere herein.

In response to determining that the security classification satisfies the parameter(s) in a set of parameters of an obscuring policy (e.g., a "YES" in block 1404), the processor 108 obscures the display of the data on one or more displaying devices (e.g., a display device 102, a set of display devices 102A through 102n, a display 112, a set of displays 112A through 112n, or a display 112 and a sub-display 114) (block 1406). The data may be obscured utilizing any of the embodiments, techniques, and/or methods for obscuring data so that the data is not readable and/or viewable by a human on the displaying device(s), as discussed elsewhere herein.

In response to determining that the security classification does not satisfy the parameter(s) in a set of parameters of an obscuring policy (e.g., a "NO" in block 1404), the processor 108 freely displays the data on one or more displaying devices (block 1408). That is, the data may be displayed and/or presented on the displaying device(s) so that the data is readable and/or viewable by a human, as discussed elsewhere herein. The method 1400 may end or the processor 108 may wait for subsequent data to be displayed on the displaying device(s) and repeat the method 1400.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor of an information handling device; and
a memory configured to store code executable by the processor to:
determine a security classification for data being displayed on a display device in communication with the processor,
selectively obscure the data being displayed on the display device based on the determined security classification for the data, and
freely display, on a sub-display device in communication with the processor, the data that is selectively obscured on the display device in response to the sub-display device including a smaller size than the display device.

2. The apparatus of claim 1, wherein:
the determined security classification is based on a set of importance metrics for the data; and
selectively obscuring the data comprises:
rendering the data unreadable by a human on the display device in response to the determined security classification for the data being greater than or equal to a threshold security classification, and
rendering the data freely readable by a human on the display device in response to the determined security classification for the data being less than the threshold security classification.

3. The apparatus of claim 2, wherein:
the code further causes the processor to determine the set of importance metrics for the data; and
the set of importance metrics includes at least one importance metric indicating a value of at least one corresponding factor in a set of factors for the data.

4. The apparatus of claim 1, wherein the security classification of the data is based on a set of environmental metrics for the display device and a set of importance metrics for the data.

5. The apparatus of claim 4, wherein:
the set of environmental metrics includes at least one environmental metric indicating a value of at least one corresponding environmental factor in a set of environmental factors for an environment within which the display device currently resides; and
the set of importance metrics includes at least one importance metric indicating a value of at least one corresponding factor in a set of factors for the data.

6. The apparatus of claim 5, wherein selectively obscuring the data comprises:
rendering the data unreadable by a human on the display device in response to the determined security classification for the data being greater than or equal to a threshold security classification; and
rendering the data freely readable by a human on the display device in response to the determined security classification for the data being less than the threshold security classification.

7. The apparatus of claim 6, wherein:
the set of environmental factors for the environment within which the display device currently resides comprises at least one of a geographic boundary of the environment, a virtual boundary of the environment, a presence of humans in the environment, a proximity of at least one human in the environment, and a quantity of humans detected in the environment; and
the identified set of importance metrics for the data comprises at least one of a source of the data, metadata for the data, and a tag in the data.

8. A method, comprising:
determining, by a processor, a security classification for data being displayed on a display device in communication with the processor;
selectively obscuring the data being displayed on the display device based on the determined security classification for the data; and
freely displaying, on a sub-display device in communication with the processor, the data that is selectively obscured on the display device in response to the sub-display device including a size smaller than the display device.

9. The method of claim 8, wherein:
the determined security classification is based on a set of importance metrics for the data; and
selectively obscuring the data comprises:
rendering the data unreadable by a human on the display device in response to the determined security classification for the data being greater than or equal to a threshold security classification, and
rendering the data freely readable by a human on the display device in response to the determined security classification for the data being less than the threshold security classification.

10. The method of claim 9, wherein:
the method further comprises determining the set of importance metrics for the data; and
the set of importance metrics includes at least one importance metric indicating a value of at least one corresponding factor in a set of factors for the data.

11. The method of claim 8, wherein the security classification of the data is based on a set of environmental metrics for the display device and a set of importance metrics for the data.

12. The method of claim 11, wherein:
the set of environmental metrics includes at least one environmental metric indicating a value of at least one corresponding environmental factor in a set of environmental factors for an environment within which the display device currently resides; and
the set of importance metrics includes at least one importance metric indicating a value of at least one corresponding factor in a set of factors for the data.

13. The method of claim 12, wherein selectively obscuring the data comprises:
rendering the data unreadable by a human on the display device in response to the determined security classification for the data being greater than or equal to a threshold security classification; and
rendering the data freely readable by a human on the display device in response to the determined security classification for the data being less than the threshold security classification.

14. The method of claim 13, wherein:
the set of environmental factors for the environment within which the display device currently resides comprises at least one of a geographic boundary of the environment, a virtual boundary of the environment, a presence of humans in the environment, a proximity of at least one human in the environment, and a quantity of humans detected in the environment; and
the identified set of importance metrics for the data comprises at least one of a source of the data, metadata for the data, and a tag in the data.

15. A computer program product comprising a non-transitory computer-readable storage medium configured to store code executable by a processor, the executable code comprising code to perform:
determining a security classification for data being displayed on a display device, and
selectively obscuring the data being displayed on the display device based on the determined security classification for the data; and
freely displaying, on a sub-display device, the data that is selectively obscured on the display device in response to the sub-display device including a smaller size than the display device.

16. The computer program product of claim 15, wherein:
the determined security classification is based on a set of importance metrics for the data; and
selectively obscuring the data comprises:
rendering the data unreadable by a human on the display device in response to the determined security classification for the data being greater than or equal to a threshold security classification, and
rendering the data freely readable by a human on the display device in response to the determined security classification for the data being less than the threshold security classification.

17. The computer program product of claim 16, wherein:
the code further comprises code to determine the set of importance metrics for the data; and
the set of importance metrics includes at least one importance metric indicating a value of at least one corresponding factor in a set of factors for the data.

18. The computer program product of claim 15, wherein:
the security classification of the data is based on a set of environmental metrics for the display device and a set of importance metrics for the data;
the set of environmental metrics includes at least one environmental metric indicating a value of at least one corresponding environmental factor in a set of environmental factors for an environment within which the display device currently resides; and the set of importance metrics includes at least one importance metric indicating a value of at least one corresponding factor in a set of factors for the data.

19. The computer program product of claim 18, wherein selectively obscuring the data comprises:
- rendering the data unreadable by a human on the display device in response to the determined security classification for the data being greater than or equal to a threshold security classification; and
- rendering the data freely readable by a human on the display device in response to the determined security classification for the data being less than the threshold security classification.

20. The computer program product of claim 19, wherein:
- the set of environmental factors for the environment within which the display device currently resides comprises at least one of a geographic boundary of the environment, a virtual boundary of the environment, a presence of humans in the environment, a proximity of at least one human in the environment, and a quantity of humans detected in the environment; and
- the identified set of importance metrics for the data comprises at least one of a source of the data, metadata for the data, and a tag in the data.

* * * * *